US010749989B2

(12) United States Patent
Le et al.

(10) Patent No.: US 10,749,989 B2
(45) Date of Patent: Aug. 18, 2020

(54) HYBRID CLIENT/SERVER ARCHITECTURE FOR PARALLEL PROCESSING

(71) Applicant: Microsoft Technology Licensing LLC, Redmond, WA (US)

(72) Inventors: Christopher Dac Le, Redmond, WA (US); Michael Calcagno, Seattle, WA (US); Jon Hamaker, Issaquah, WA (US); Rob Chambers, Sammamish, WA (US); Michael Plumpe, Seattle, WA (US); Travis Wilson, Redmond, WA (US)

(73) Assignee: Microsoft Technology Licensing LLC, Redmond, WA (US)

(*) Notice: Subject to any disclaimer, the term of this patent is extended or adjusted under 35 U.S.C. 154(b) by 313 days.

(21) Appl. No.: 14/480,422

(22) Filed: Sep. 8, 2014

(65) Prior Publication Data

US 2015/0281401 A1 Oct. 1, 2015

Related U.S. Application Data

(60) Provisional application No. 61/973,770, filed on Apr. 1, 2014.

(51) Int. Cl.
*G06F 17/27* (2006.01)
*H04L 29/06* (2006.01)
(Continued)

(52) U.S. Cl.
CPC .............. *H04L 67/42* (2013.01); *G06F 9/547* (2013.01); *G06F 40/20* (2020.01)

(58) Field of Classification Search
None
See application file for complete search history.

(56) References Cited

U.S. PATENT DOCUMENTS 6,088,671 A 7/2000 Gould et al.
6,487,534 B1 11/2002 Thelen et al.
(Continued)

FOREIGN PATENT DOCUMENTS

CN 1317783 A 10/2001
CN 1408182 A 4/2003
(Continued)

OTHER PUBLICATIONS

"International Search Report & Written Opinion Received for PCT Application No. PCT/US2015/023228", dated Jul. 29, 2015, 9 Pages.
(Continued)

*Primary Examiner* — Sargon N Nano
*Assistant Examiner* — Christopher B Robinson

(57) ABSTRACT

The present disclosure describes an exemplary hybrid client/server architecture that may be utilized leverage the unique capabilities of both remote and local services. Data may be processed in parallel by remote and local processes. Results generated during the parallel processing may be exchanged between remote and local services and used to update results generated by the separate services. The hybrid client/server architecture may be utilized to generate enhanced inferences, hybrid subscriptions base upon local and remote subscriptions, and enhance natural language expression evaluation services.

20 Claims, 18 Drawing Sheets

(51) Int. Cl.
   *G06F 9/54*    (2006.01)
   *G06F 40/20*   (2020.01)

(56) References Cited

U.S. PATENT DOCUMENTS

| | | | |
|---|---|---|---|
| 6,523,061 | B1 | 2/2003 | Halverson et al. |
| 6,546,401 | B1 | 4/2003 | Lizuka et al. |
| 6,609,091 | B1 | 8/2003 | Budzinski |
| 6,738,743 | B2 | 5/2004 | Sharma et al. |
| 6,745,161 | B1 | 6/2004 | Arnold et al. |
| 6,839,669 | B1 | 1/2005 | Gould et al. |
| 7,013,275 | B2 | 3/2006 | Arnold et al. |
| 7,228,277 | B2 | 7/2007 | Nagashima |
| 7,401,132 | B1 | 7/2008 | Krumel et al. |
| 7,624,018 | B2* | 11/2009 | Chambers ............... 704/275 |
| 7,716,051 | B2 | 5/2010 | Dow et al. |
| 7,747,782 | B2 | 6/2010 | Hunt et al. |
| 7,983,911 | B2 | 7/2011 | Soufflet et al. |
| 8,150,678 | B2 | 4/2012 | Sagawa |
| 8,224,644 | B2 | 7/2012 | Krumel et al. |
| 8,249,877 | B2 | 8/2012 | Koll |
| 8,364,481 | B2 | 1/2013 | Strope et al. |
| 8,831,947 | B2 | 9/2014 | Wasserblat et al. |
| 8,930,194 | B2 | 1/2015 | Newman et al. |
| 8,949,130 | B2 | 2/2015 | Phillips |
| 8,972,263 | B2 | 3/2015 | Stonehocker |
| 9,190,056 | B2 | 11/2015 | Zhu et al. |
| 9,201,965 | B1 | 12/2015 | Gannu |
| 9,208,787 | B2 | 12/2015 | Hayn et al. |
| 9,305,545 | B2 | 4/2016 | Cheung |
| 9,502,029 | B1 | 11/2016 | Bell et al. |
| 9,530,416 | B2 | 12/2016 | Stern et al. |
| 9,601,108 | B2 | 3/2017 | Wilson et al. |
| 2002/0013706 | A1 | 1/2002 | Profio |
| 2002/0120448 | A1 | 8/2002 | Garner et al. |
| 2002/0143551 | A1 | 10/2002 | Sharma et al. |
| 2003/0125869 | A1 | 7/2003 | Hugh Jr. |
| 2003/0177009 | A1 | 9/2003 | Odinak et al. |
| 2003/0233237 | A1 | 12/2003 | Garside et al. |
| 2004/0098263 | A1 | 5/2004 | Hwang et al. |
| 2004/0107088 | A1 | 6/2004 | Budzinski |
| 2005/0102142 | A1 | 5/2005 | Soufflet et al. |
| 2005/0203740 | A1 | 9/2005 | Chambers et al. |
| 2007/0043566 | A1 | 2/2007 | Chestnut et al. |
| 2007/0043687 | A1 | 2/2007 | Bodart et al. |
| 2007/0067305 | A1 | 3/2007 | Ives et al. |
| 2007/0179778 | A1 | 8/2007 | Gong et al. |
| 2007/0276651 | A1* | 11/2007 | Bliss ............... G10L 15/30 704/9 |
| 2008/0005057 | A1 | 1/2008 | Ozzie et al. |
| 2008/0059193 | A1 | 3/2008 | Huang et al. |
| 2008/0154870 | A1 | 6/2008 | Evermann et al. |
| 2009/0055185 | A1 | 2/2009 | Nakade et al. |
| 2009/0177462 | A1 | 7/2009 | Alfven |
| 2010/0082343 | A1 | 4/2010 | Levit et al. |
| 2010/0114577 | A1 | 5/2010 | Hayn et al. |
| 2010/0161328 | A1* | 6/2010 | Krumel ............... G10L 15/30 704/236 |
| 2010/0268534 | A1 | 10/2010 | Kishan Thambiratnam et al. |
| 2011/0112921 | A1 | 5/2011 | Kennewick et al. |
| 2011/0288857 | A1 | 11/2011 | Carraux et al. |
| 2011/0289076 | A1* | 11/2011 | Boyle ............... G06N 5/04 707/723 |
| 2012/0053935 | A1 | 3/2012 | Malegaonkar et al. |
| 2012/0179471 | A1 | 7/2012 | Newman et al. |
| 2012/0215539 | A1 | 8/2012 | Juneja |
| 2012/0296644 | A1* | 11/2012 | Koll ............... G10L 15/32 704/231 |
| 2013/0028443 | A1 | 1/2013 | Pance et al. |
| 2013/0030804 | A1 | 1/2013 | Zavaliagkos et al. |
| 2013/0060571 | A1 | 3/2013 | Soemo et al. |
| 2013/0085753 | A1 | 4/2013 | Bringert et al. |
| 2013/0132084 | A1 | 5/2013 | Stonehocker et al. |
| 2013/0332162 | A1 | 12/2013 | Keen |
| 2013/0337853 | A1 | 12/2013 | Korn et al. |
| 2013/0346078 | A1* | 12/2013 | Gruenstein ............ G10L 15/18 704/235 |
| 2014/0059603 | A1 | 2/2014 | Lee et al. |
| 2014/0122071 | A1 | 5/2014 | Sierawski et al. |
| 2014/0207442 | A1* | 7/2014 | Ganong ............... H04W 12/02 704/201 |
| 2014/0278411 | A1 | 9/2014 | Cheung |
| 2014/0288932 | A1 | 9/2014 | Yeracaris et al. |
| 2014/0365216 | A1 | 12/2014 | Gruber et al. |
| 2015/0081293 | A1 | 3/2015 | Hsu et al. |
| 2015/0106096 | A1 | 4/2015 | Toopran et al. |
| 2015/0120288 | A1* | 4/2015 | Thomson ............... G10L 15/22 704/231 |
| 2015/0161985 | A1 | 6/2015 | Peng et al. |
| 2015/0206528 | A1 | 7/2015 | Wilson et al. |
| 2015/0314454 | A1 | 11/2015 | Breazeal et al. |
| 2017/0162204 | A1 | 6/2017 | Wilson et al. |

FOREIGN PATENT DOCUMENTS

| | | |
|---|---|---|
| CN | 101454775 A | 6/2009 |
| CN | 102469112 A | 5/2012 |
| CN | 102496364 A | 6/2012 |
| CN | 102594717 A | 7/2012 |
| CN | 102760431 A | 10/2012 |
| CN | 103165130 A | 6/2013 |
| CN | 103491429 A | 1/2014 |
| EP | 1136983 | 9/2001 |
| EP | 1475778 | 11/2004 |
| JP | H10171490 | 6/1998 |
| WO | WO 2002103675 | 12/2002 |
| WO | WO 2009145796 | 12/2009 |
| WO | 2015026366 A1 | 2/2015 |

OTHER PUBLICATIONS

U.S. Appl. No. 14/158,147, Office Action dated Dec. 31, 2015, 12 pgs.
PCT International Preliminary Report on Patentability in International Application PCT/US2015/010943, dated Feb. 5, 2016, 5 pgs.
PCT 2nd Written Opinion Received in Application No. PCT/US2015/023228, dated Feb. 8, 2016, 5 pgs.
U.S. Appl. No. 14/158,147, Amendment and Response filed Mar. 31, 2016, 13 pgs.
U.S. Appl. No. 14/158,147, Office Action dated Jun. 10, 2016, 30 pgs.
PCT International Preliminary Report on Patentability Issued in International Application PCT/US2015/023228, dated Jun. 16, 2016, 6 pgs.
PCT International Search Report and Written Opinion in International Application PCT/US2015/010943, dated Mar. 9, 2015, 11 pgs.
Beutler, Rene et al., "Integrating Statistical and Rule-Based Knowledge for Continuous German Speech Recognition", 11, Sep. 1, 2003, 4 pgs.
"Speech Recognition in Office XP", Microsoft Corporation, http://www.microsoft.com/office/previous/xp/speech/asp, May 30, 2001, pp. 1-3.
"Using Speech Recognition for the First Time in Office", Microsoft Corporation, http://office.microsoft.com/en-us/assistance/HA010565111033.asgx, pp. 1-3.
"VoiceXML and Next-Generation Voice Services", Adam Hocek, MXL 2002 Proceedings by deepX, www.RenderX.com, pp. 1-15.
"Your Pad or MiPad", Microsoft Corporation, http://research.microsoft.com/research/srg/mipad.aspx, 2006, pp. 1-2.
IBM Via Voice Gold, IBM, pp. 1-46.
Mace, Michael, "Mobile Opportunity", Web 3.0, Oct. 14, 2008, http://mobileopportunity.blogspot.com/2005/11/web-30.html., pp. 1-9.
Miranda, et al., "A Platform of Distributed Speech Recognition for the European Portuguese Language", In Proceedings of 8th International Conference on Computational Processing of the Portuguese Language, Sep. 8, 2008, 10 pages.
Morde, Ashutosh, et al., "A Multimodal System for Accessing Driving Directions"; DAS 2002, LNCS 2423, 2002, http://www.springerlink.com/content/tg3w66jjfu1 vahuk/fulltext.pdf, pp. 556-567.

(56) References Cited

OTHER PUBLICATIONS

Turnen, Markku, et al.: "Spoken and Multimodal Communication Systems in Mobile Settings", A. Esposito et al. (Eds.), Verbal and Nonverbal Commun. Behaviours, LNAI 4775, 2007, http://www.springerlink.com/content/75t7x54587827240/fulltext.pdf., pp. 227-241.
U.S. Appl. No. 10/799,356, Advisory Action dated Mar. 14, 2008, 3 pgs.
U.S. Appl. No. 10/799,356, Amendment and Response filed Feb. 13, 2009, 5 pgs.
U.S. Appl. No. 10/799,356, Amendment and Response filed Feb. 19, 2008, 5 pgs.
U.S. Appl. No. 10/799,356, Amendment and Response filed Jul. 10, 2009, 12 pgs.
U.S. Appl. No. 10/799,356, Amendment and Response filed Sep. 7, 2007, 3 pgs.
U.S. Appl. No. 10/799,356, Appeal Brief filed Jul. 21, 2008, 17 pgs.
U.S. Appl. No. 10/799,356, Notice of Allowance dated Sep. 17, 2009, 6 pgs.
U.S. Appl. No. 10/799,356, Office Action dated Oct. 8, 2008, 10 pgs.
U.S. Appl. No. 10/799,356, Office Action dated Nov. 14, 2008, 9 pgs.
U.S. Appl. No. 10/799,356, Office Action dated Nov. 19, 2007, 10 pgs.
U.S. Appl. No. 10/799,356, Office Action dated Apr. 17, 2009, 9 pgs.
U.S. Appl. No. 10/799,356, Office Action dated Jun. 5, 2007, 8 pgs.
U.S. Appl. No. 12/337,810, Office Action dated Nov. 30, 2011, 7 pgs.
U.S. Appl. No. 12/337,810, Amendment and Response filed Feb. 29, 2012, 12 pgs.
U.S. Appl. No. 12/337,810, Notice of Allowance dated Mar. 15, 2012, 8 pgs.
O'Grady, Jason D., "Siri hacked to work with Spotify, Instagram and other third-party apps", Published on: Mar. 5, 2014, Available at: http://www.zdnet.com/siri-hacked-to-work-with-spotify-instagram-and-other-third-party-apps-7000027023/.
"Apple—iOS 7—Siri", Published on: Sep. 15, 2012, Available at: http://www.apple.com/ios/siri/.
Barlas, Omar, "Illuminator—Natural User Interface Application to Control other Windows Apps", Published on: Aug. 21, 2013, Available at: http://www.codeproject.com/Articles/640283/ILLUMINATOR-Natural-User-Interface-Application-to.
Acero, et al., "Live Search for Mobile:Web Services by Voice on the Cellphone", In IEEE International Conference on Acoustics, Speech and Signal Processing, Mar. 31, 2008, Available at: http://ieeexplore.ieee.org/stamp/stamp.jsp?arnumber=4518845&isnumber=4517521.
Savitz, Eric, "Beyond Voice Recognition: It's The Age of Intelligent Systems", Published on: Jan. 14, 2013, Available at: http://www.forbes.com/sites/ciocentral/2013/01/11/beyond-voice-recognition-its-the-age-of-intelligent-systems/.
Nusca, Andrew, "How Apple's Siri Really Works", Published on: Nov. 3, 2011 Available at: http://www.zdnet.com/blog/btl/how-apples-siri-really-works/62461.
U.S. Appl. No. 14/158,147, filed Jan. 17, 2014, 32 pages.
U.S. Appl. No. 14/158,147, Amendment and Response filed Oct. 11, 2016, 10 pgs.
U.S. Appl. No. 14/158,147, Notice of Allowance dated Nov. 16, 2016, 8 pgs.
Carolina Parada et al., "A Spoken Term Detection Framework for Recovering Out-of-Vocabulary Words Using the Web", Proc. Interspeech, Sep. 30, 2010. Retrieved from the Internet: URL: http://www.cisp.jhu.edu/~carolinap/papers/oovrecovery_interspeech10.pdf, 4 pages.
European Patent Application 14185452.1, Extended Search Report dated Jan. 23, 2015, 7 pages.
"Office Action Issued in European Patent Application No. 15723339.6", dated Aug. 9, 2018, 8 Pages.
"Final Office Action Issued in U.S. Appl. No. 14/490,321", dated Dec. 28, 2017, 15 Pages.
"Final Office Action Issued in U.S. Appl. No. 14/490,321", dated Aug. 24, 2016, 15 Pages.
"Non Final Office Action Issued in U.S. Appl. No. 14/490,321", dated Feb. 9, 2016, 12 Pages.
"Non Final Office Action Issued in U.S. Appl. No. 14/490,321", dated Apr. 4, 2017, 20 Pages.
"Non Final Office Action Issued in U.S. Appl. No. 15/426,640", dated Jun. 28, 2018, 10 Pages.
"Final Office Action Issued in U.S. Appl. No. 14/490,321", dated Aug. 20, 2019, 15 Pages.
"Office Action Issued in Chinese Patent Application No. 201580004735.4", dated Feb. 28, 2019, 10 Pages.
"First Office Action and Search Report Issued in Chinese Patent Application No. 201580018588.6", dated Feb. 2, 2019, 16 Pages.
"Second Office Action Issued in Chinese Patent Application No. 201580018588.6", dated Aug. 1, 2019, 11 Pages.
"Non Final Office Action Issued in U.S. Appl. No. 14/490,321", dated Feb. 15, 2019, 14 Pages.
"Notice of Allowance Issued in U.S. Appl. No. 15/426,640", dated Jan. 9, 2019, 8 Pages.
"Advisory Action Issued in U.S. Appl. No. 14/490,321", dated Nov. 22, 2019, 4 Pages.
"Non Final Office Action Issued in U.S. Appl. No. 14/490,321", dated Jan. 23, 2020, 15 Pages.
"Summons to Attend Oral Issued in European Patent Application No. 15723339.6", dated Nov. 11, 2019, 7 Pages.
"Third Office Action and Search Report Issued in Chinese Patent Application No. 201580018588.6", dated Dec. 9, 2019, 14 Pages.
"Summons to Attend Oral Proceedings Issued in European Patent Application No. 15723339.6", dated Mar. 18, 2020, 6 Pages.

\* cited by examiner

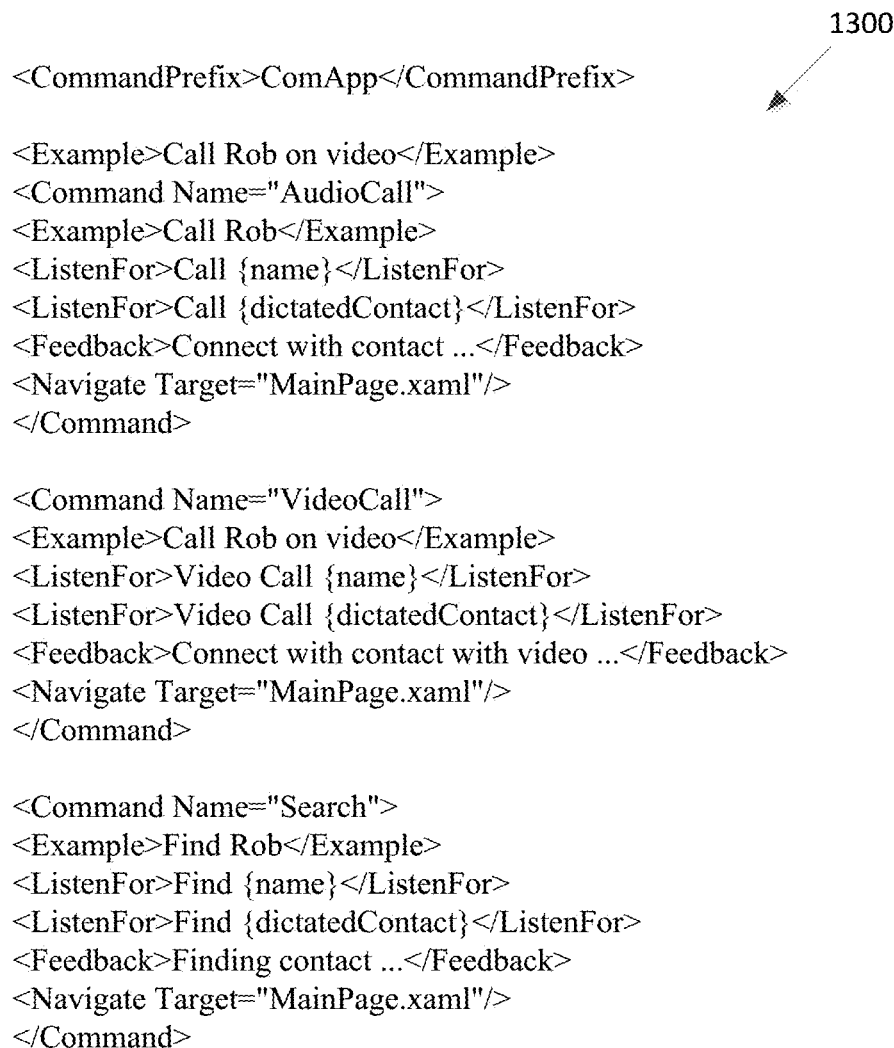

```
<CommandPrefix>ComApp</CommandPrefix>

<Example>Call Rob on video</Example>
<Command Name="AudioCall">
<Example>Call Rob</Example>
<ListenFor>Call {name}</ListenFor>
<ListenFor>Call {dictatedContact}</ListenFor>
<Feedback>Connect with contact ...</Feedback>
<Navigate Target="MainPage.xaml"/>
</Command>

<Command Name="VideoCall">
<Example>Call Rob on video</Example>
<ListenFor>Video Call {name}</ListenFor>
<ListenFor>Video Call {dictatedContact}</ListenFor>
<Feedback>Connect with contact with video ...</Feedback>
<Navigate Target="MainPage.xaml"/>
</Command>

<Command Name="Search">
<Example>Find Rob</Example>
<ListenFor>Find {name}</ListenFor>
<ListenFor>Find {dictatedContact}</ListenFor>
<Feedback>Finding contact ...</Feedback>
<Navigate Target="MainPage.xaml"/>
</Command>
```

HYBRID CLIENT/SERVER ARCHITECTURE FOR PARALLEL PROCESSING

PRIORITY

This application claims the benefit of, and priority to, U.S. Provisional Application No. 61/973,770, filed on Apr. 1, 2014, which is hereby incorporated by reference in its entirety.

BACKGROUND

Distributed networks generally have access to more computing resources and can therefore perform complicated processing tasks relatively efficiently. Additionally, applications that reside on distributed networks may be frequently updated and, as such, tend to incorporate newer functionality. Due to these factors, many services that were once performed on a local device are now performed using a remote device that may be part of a distributed network. However, remote services are generally implemented such that they can be used by many different clients. Because of this, generalized remote services may not have access to information that can be used to provide a high degree of personalization for a specific user. Furthermore, in many situations, personal data on a client device cannot be transferred to the remote device. Therefore, it is difficult to utilize remote services in a manner to perform personalized tasks for an individual.

It is with respect to these and other general considerations that embodiments have been made. Also, although relatively specific problems have been discussed, it should be understood that the embodiments should not be limited to solving the specific problems identified in the background.

SUMMARY

Embodiments of the present disclosure relate to a hybrid client/server architecture that provides for shared processing of input received at a client device, such as a tablet computer, a smartphone, or any other computing system by services local to the client device and remote services communicating with the client device over a network. When a client device receives input from a user, data from a process or application local to the device, data from a device sensor (e.g., microphone, GPS, accelerometer, etc.), or data from a remote device or process, the client device may analyze the data to determine whether it is appropriate and/or efficient to send the data to a remote service to be processed in addition to any processing of the data that may occur on the device. If the device determines that the data should be provided to the remote service (e.g., an application executing on a remote device, such as a server, and/or a distributed network of remote devices), the client device sends the data (and any related commands or information) to the remote service for processing. Meanwhile, the local device also begins processing the data using a local service. A remote service may receive the data and begins processing in addition to any processing that may be performed on the device. The remote service may process the data simultaneously or substantially simultaneously as the device, may begin processing the data before the device completes processing the data, or may process the data at another time. In embodiments, the local service and the remote service exchange data during processing. Doing so may enhance the processing ability of both the local and remote services.

In an embodiment, a hybrid client/server architecture may be employed to generate inferences about a user based upon her interaction(s) with a client device. In embodiments, inferences may identify information about a person including her likes and dislikes, habits, upcoming events that she plan on attending, etc. In embodiments, an inference may be any type of identification or determination of information about and/or related to an individual based upon the user's habits, location, calendar, web history, search history, contacts, device usage, etc. A local inference service on the client device may process some data that may not be appropriate to send to a remote device, such as, for example, private data, or data that may not be efficient to send over a network, such, for example, accelerometer data, to generate initial inferences about the user. In more specific embodiments, the initial inferences may not include private data or may be abstracted to remove any private data. Upon determining that the initial inference does not include private information, the inference may be sent to a remote inference service for further processing. The remote inference service may leverage additional data available to the remote device and/or distributed network of remote devices to provide enhanced inferences. The enhanced inferences may be stored in a user profile and used to customize device interaction with the user.

In yet another embodiment, a hybrid client/service architecture may be employed to generate hybrid subscriptions based upon local and remote subscriptions. A relationship may be identified between a local subscription, such as a local service that monitors a user's location, and a remote service, such as a remote service that delivers news updates. Relationships between the services may be leveraged to create a hybrid service that intelligently presents notifications to the user based upon a combination of local and remote services.

Further embodiments of the present disclosure provide a hybrid client/service architecture capable of leveraging and merging the benefits provided by both local and remote natural language expression (NLE) evaluation processes or services. In embodiments, a NLE process receives input as natural language and interprets the NLE to identify commands, data, etc. An exemplary NLE evaluation process is a speech recognizer. However, other NLE evaluation processes may be employed with the embodiments disclosed herein such as, for example, a text evaluation process. The hybrid client/server architecture provides a system in which natural language expressions may be evaluated both locally and by a remote service. The local and remote evaluation services may exchange interpretations that each service can use to update and enhance speech recognition results. The hybrid client/server architecture may also be leveraged to provide third party developers the ability to define a third party knowledge base (e.g., data and or rules provided by a third party, third party grammars, third party hints, etc.) that may be used to aid in the evaluation of natural language expressions related to a specific application. The third party knowledge base may be used by a local or remote based NLE evaluation process to optionally augment their built in abilities to evaluate an NLE to improve results.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

FIG. 13 is an embodiment of an exemplary third party grammar 1300 for a communications application.

DETAILED DESCRIPTION

Figure 1:
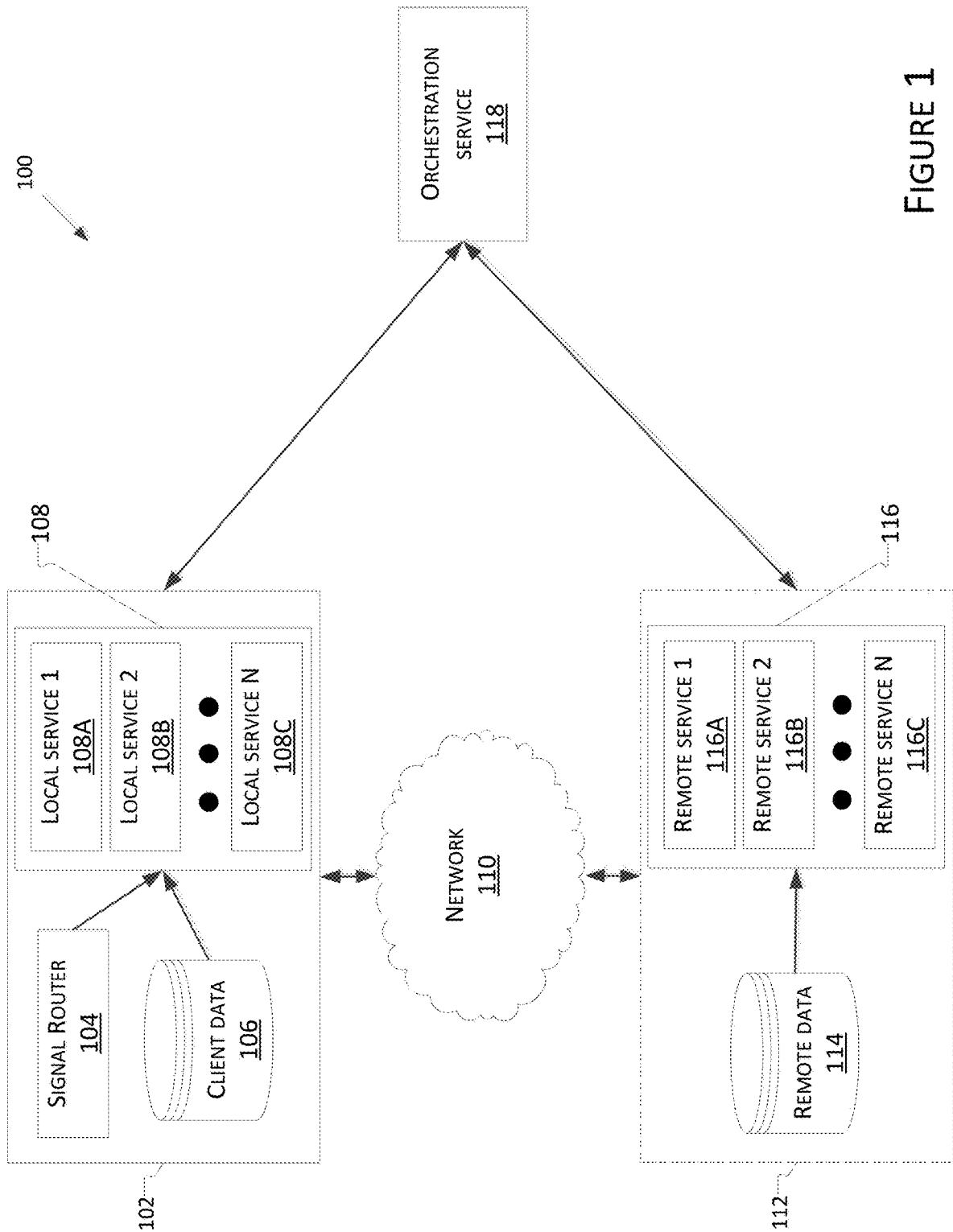
FIG. 1 is an embodiment of a hybrid client/server system 100 capable of performing shared processing data on a client device and a distributed network.

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems and/or devices. Accordingly, embodiments may take the form of a hardware implementation, an entirely software implementation or an implementation combining software and hardware aspects. The following detailed description is, therefore, not to be taken in a limiting sense.

Embodiments of the present disclosure relate to a hybrid client/server architecture that decouples device specific processes and allows processing of data to be split across a client device and a distributed network, also referred to as a "cloud." A distributed network may include one or more remote devices that communicate with the client device via a network, such as, for example, the Internet. In certain aspects, distributed networks may have more resources available (e.g., memory and processing capabilities) that allow for the performance of larger tasks and allows for the faster completion of tasks than if they were performed on a client device. As such, the distributed network may provide remote services (e.g., processes or applications, a cloud service, etc.) that provide additional functionality than local services resident on the client device. However, in certain circumstances it may be undesirable to provide the information necessary to complete a task to the distributed network. For example, reasons such as privacy concerns, bandwidth usage, power consumption, etc. may make it undesirable to send some types of information to a distributed network for processing. Limitations that result from such considerations may be overcome by employing a hybrid client/server architecture that allows for the shared processing of tasks by local services on a client device and remote services on a executing on one or more remote devices (e.g., a server or servers) that may be part of a distributed network. However, in other embodiments, the remote device may not be part of a distributed network. The disclosed embodiments further provide for an exchange of information between the local service and the remote service during processing. In embodiments, such information may include results generated by the individual processes or different sets of data available to the individual processes.

Embodiments of the present disclosure employ a hybrid client/server architecture to enhance applications such as productivity applications, calendar applications, and map applications, device notifications, device functionality, etc. In other embodiments, the hybrid client/server architecture may be employed to enhance an application such as personal digital assistant on a client device or other user experience (UX) elements of a device. In embodiments, the hybrid client/server architecture may be employed to generate leverage the strengths of both a local device and one or more remote devices to interpret and process data. Among other uses, the hybrid/client server embodiments disclosed herein may be used to provide enhanced inferences, hybrid subscriptions, and enhanced natural language expression evaluation (e.g., speech recognition, text processing, etc.), identify information that may be of interest or relevant to a user. These features may be used to intelligently update an application, UX elements of an application or device, provide additional information to a device, etc. based upon the likes, dislikes, and/or patterns of a particular user.

FIG. 1 is an embodiment of a hybrid client/server system 100 capable of shared processing data. Shared processing of data may include the processing of data by one or more local services (e.g., a service, application, process, etc. executing on a client device) and remote services data simultaneously or substantially simultaneously as the device, in parallel, and/or before the remote service or local service completes processing data. In other embodiments, shared processing may include processing by different services on a distributed network and one or more devices to perform a common task, identify a common solution, reach a common result, etc. The hybrid client/server system 100 includes at least one client device 102 communicating with a distributed network 112 via a communications network 110. Communications network 110 may be any type of wired or wireless network or a combination of a wired and wireless network. Non-limiting examples of such networks include a local area network (LAN), a wide area network (WAN), a plain old telephone service (POTS) network, a cellular data network, a satellite data network, a Wi-Fi network, and/or the Internet. In embodiments, client device 102 may be a smart phone, a tablet, a laptop, a personal computer, or any other type of computing device capable of exchanging data over a network. In embodiments, the distributed network 112 may be a distributed system of computing devices, data stores, and software capable of sharing network resources and coordinating actions across devices to produce a result. The computing devices, data stores, and software that make up the distributed network 112 located remotely from client device 102. In embodiments, the distributed network 112 may be capable of executing a distributed program to perform a task. Components of the task may be spread across multiple computing devices that are part of the distributed network 112, each of which perform a component of the task and communicate data related to the task amongst each other using messages. The individual computing devices and data stores that are part of the distributed network 112 may be connected by a network, such as a LAN, a WAN, or any other type of network.

The hybrid client/server system allows for data to be processed in parallel by the client device 102 and the distributed network 112. The ability to perform shared processing of the data takes advantages of the different capabilities and data stores provided by the client device and the distributed network. For example, the client device may contain personal data, such as user contacts, calendar information, current location, that may not be available on the distributed network. As such, the systems and methods disclosed herein may collect information, which may include personally-identifiable information (PII), for routine business purposes, such as, but not limited to, security auditing, product support, product improvement, product registration, and user registration. As used herein, PII broadly includes anything that users do not want others know. This usually means any data collected about the users or provided by them unless they have explicitly authorized the organization to share that information. Some common examples of PII are name, birthdate, SSN, account name, and phone number. Other data that may be considered PII includes IP address, company name, and location information. In the interest of privacy a person might choose not to have his or her location tracked and transmitted, but some people will choose voluntarily to allow their location to be transmitted.

The client device may contain different types of hardware and software components such that may generate or otherwise provide data for the processing by the client device 102 and/or the distributed network 112. In embodiments, the hardware and software components of the client device 102 may also be employed to process the data. The distributed network 112, on the other hand, has more processing power and access to more data and information that may be used to process data received from client device 102. The hybrid client/server system 100 provides the ability to leverage the different strengths of the client device 102 and the distributed network 112 to reach an improved determination or result when processing a set of data. In embodiments, the hybrid client/server system also includes an orchestration service 118 that coordinates the shared processing of the data by the client 112 and the distributed network 112. In embodiments, the orchestration service may determine what data to send to the distributed network 112 for processing, determine when a final result has been reached by either the client device 102 or the distributed network 112, and/or determine a best result from a set of results provided by the client 102 and the distributed network 112. In embodiments, the orchestration service 118 may be resident on the client device 102, on the distributed network 112, or on a different device.

In general, the client device 102 may generate and/or receive data and, upon generation or reception of the data, identify a task or process that relates to the received data. The client device 102 may also send the data to the distributed network 112 via communications network 110 while processing the data using one or more local services 108, such as local services 108A-C. While the client device 112 is processing the data locally, the distributed network 112 receives the data being processed by the device, or a subset of the data being processed by the device, from the client and begins processing the received data using one or more remote services 116, such as remote services 116A-C. In embodiments, results and/or determinations made during the processing may be shared between client device 102 (also referred to as client 102 or local device 102) and the distributed network 112 as they are generated. The shared results may be used by both the client device 102 and the distributed network 112 to update their own determinations and/or results or may be received as input to a service that is processing the data to refine the determinations and/or results generated by the client 102 and/or the distributed network 112. In embodiments, after sharing initial determinations, a final result or determination may be generated by both the client 102 and the distributed network 112. The final results or determinations may be analyzed by another service, such as orchestration service 118, to determine the best result or determination. The best result or determination may be reached by the client 102, by the distributed network 112, by both the client 102 and distributed network 112, or be a combination of the results reached by the client 102 and the distributed network. The improved result, or determination, may then be provided to the client device 102, the distributed network 112, or both. In embodiments, the improved result may be the most likely result given the data being processed, the result with the highest confidence of being correct, and/or may be a determination of additional actions to identify a correct result (e.g., prompting the user to select a correct result). In embodiments, the client device 102 may perform an action based on the final result determined by the orchestration service 118.

In general, client device 102 includes a signal router 104, client data 106, and local services 108. The signal router 104 receives one or more data. The data may include a user request or query, a command, or any other type of data. The data may be generated by user input, for example through speech or user interaction with a user input component of the client device 102. The data may also be generated by other device components, such as a device clock, an accelerometer, a GPS component, and/or any other software or hardware component that is part of the client device 102. In further embodiments, the data may be received by the client device 102 from a remote device via a network. Upon receiving the data, signal router 104 may determine whether data re should be sent to the distributed network 112. In making the determination, the signal router may determine to send all of the received and/or generated data, a subset of the received and/or generated data, or not to send any received and/or generated data to the distributed network 112. In embodiments, the determination of whether or not to send the data may be based upon a policy, such as a privacy policy, client device 102 and/or distributed network 112 capabilities, user request, and/or protocol requirements. Those skilled in the art may appreciate that other client side decisions can be made for various reasons to limit what data to send to the distributed network 112. Regardless of whether the signal router 104 determines to provide data, or a subset of the data, to the distributed network 112, the signal router may provide the data to local services 108 for processing. In embodiments, a determination of which local service to invoke to process the data may be made by the signal router, or by a controller that is part of the client device operating system or otherwise associated with the local services.

Local services 108 may include one or more services, such as services 108A-C, resident on the client device 102. A local service may be software (e.g., an application, a process, etc.) hardware encoded functionality, or a combination of hardware and software. Local services 108 provide capabilities to process data to make a determination, generate a result, perform a data conversion, perform an action, or otherwise analyze data. Exemplary local services 108 may be used to draw an inference, identify a command, perform an action, generate an alert, monitor a subscription, perform speech recognition, or otherwise process data according to the requirements of a component or application that is part of the client device 102. One of skill in the art will appreciate that any number of local services 108 may be resident on client device 102, as illustrated by Local Service 1 108A through Local Service N 108C illustrated in FIG. 1. Furthermore, one of skill in the art will appreciate that the process(es) employed by local services 108 may vary depending on the type of data received, the application or component that the local service is related to, a user request, etc. As such, an application on client device 102 may provide its own local service or services that can be added to the set of local services 108 to process data as required by the application. Embodiments disclosed herein therefore allow for a dynamic library of local services that can be modified through the addition of new applications and/or via software updates.

In embodiments, local services 108 may utilize client data 106 to aid in processing the data. In embodiments, client data 106 includes all data that is resident on client device 102 or otherwise available to client device 102. Exemplary data includes, but is not limited to, the device location, user contacts, device usage (e.g., websites visited, phone numbers called, time of certain actions, etc.), device component information (e.g., cellular information, GPS information, accelerometer data), third party application data (e.g., local application data, a third party knowledge base that may contain grammars and/or hints), etc. In embodiments, the third party application may provide an indication as to the types of actions it may perform or user intents that it is capable of satisfying. The indication may be used to aid in the determination of how the local and/or remote speech system processes the data and/or routes results. In specific embodiments, some, but not all, client data 106 may be shared with the distributed network 112. For example, due to privacy restrictions or device capability, it may not be optimal to send all the client data 106 to the distributed network 112. Privacy restrictions may prohibit client device 102 from transmitting certain data, such as user contacts, phone calls made, device location, etc. In other embodiments this information may be sent to the distributed network 112. The privacy restrictions may be selected and imposed by a user, by law or regulation, or by a third party, such as a network carrier. In other embodiments, the privacy restrictions may be elected based upon device type. For example, the privacy restrictions for a living room device, such as a gaming console, may be different than the privacy restrictions for a phone. The different restrictions may be determined by a user or determined automatically by an application and/or service provider. Furthermore, device capability may prohibit the sharing of particular types of client data 106. For example, the amount of data generated by certain device components, such as an accelerometer, may require a large amount of bandwidth to transmit the data to the distributed network 112. Such restrictions may be draining on the device battery (by requiring a continual connection to perform a large transfer of data) or may result in increased monetary costs to purchase additional data, for example, from a cellular carrier. Furthermore, some of the client data 106 may be processed more efficiently on the client device 106. Under such circumstances, local services 108 may be better situated to leverage client data 106 to process data.

Distributed network 112 may include remote data 114 and remote services 116, such as remote services 116A-C. In embodiments, distributed network 112 may receive at least a subset of data determined by the signal router 104. Distributed network may invoke one or more remote services 116 to process the received data in parallel, in addition to, simultaneously, or substantially simultaneously, to the local services 108 of device 102. In embodiments, remote services 116 may leverage the greater computing power of the distributed network 112 when processing the received data. Remote services 116 may also utilize remote data 114 to aid in the processing of data received from the client device 102. Remote data 114 may include data that is not available to the device, such as data from third party sources (e.g., news providers, stock data, airline data, etc.), as well as language grammars (e.g., lists of movies, TV shows, city names, different ways a user may request an action, etc.) that are too large to be stored on the client device 102.

Local services 108 and remote services 116 may have different capabilities, given the difference in processing power between the local device 102 and the distributed network 112, and access to different data sources that may be leverage to process the data to make a determination or generate a result based upon the data received from the client device 102. This may result in the generation of different determinations or results by the local services 108 and remote services 116. However, because local services 108 and remote services 116 may both be processing related data, the local services 108 and remote services 116 may exchange any data, results, and/or determinations that they generate so that the other service may further process the exchanged data to confirm, update, or otherwise generate better results and/or determinations. The data may be exchanged in real time (e.g., when the user is speaking or typing, etc.) or after an input signal has been completely entered but before final analysis has completed. In doing so, the hybrid client/server system 100 leverages the unique data and abilities of both the local device 102 and the distributed network 112 to make improved determinations and provide improved results in response to user actions, user queries, user requests, or events identified and/or generated by the local device 102.

In embodiments, upon generating results and/or determinations, the client device 102 and distributed network 112 may send results to an orchestration service 118. In embodiments, the orchestration service may analyze the results from the local services 108 and the remote services 116 to determine a final result and/or determination. In embodiments, the orchestration service 118 may utilize machine learning (e.g., confidence of results generated by local and/or remote services at both the phrase & word level, domain, overlap of n-best list), current user state (what actions they have taken recently, whether or not they are driving, etc.), a neural network, a ranking system, a scoring system, a confidence system, a Gaussian model, a classification model, and/or employ any other type of algorithm, model, and/or rule based mechanism to generate a final result based upon results received from the local services 108 and/or the remote services 116. One of skill in the art will appreciate that the type of algorithm or model employed by the orchestration service 118 may vary depending on the type of results or determinations received from the local services 108 or based on the type of action or output that will be requested. In embodiments, upon picking the final result, or results, the orchestration service 118 may return the result to the client device 102. In embodiments, a listing of the final results maybe prioritized. In further embodiments, the final result(s) may be sent with information in the form of a dialog or other UX output that may be used to determine final intent. Upon receiving the final result(s) from the orchestration service 118, the client device 102 may perform an action, store the result, or generate a use experience based on the received result.

While embodiments described with respect to FIG. 1 have been described with the orchestration service 118 determining a final result from the results received from the local services 108 and/or the remote services 116, in other embodiments, the orchestration service 118 may also receive initial results from the remote services 116 and local services 108 and make a determination based on the initial results. For example, upon receiving results from one of the services, the orchestration service 118 may determine that the correct result has been identified and provide a final result without waiting for initial results from the other services. In embodiments, because data received by the client device 102 may have been provided by a user expecting a real time response, the orchestration service 118 may identify lag, such as a delayed response from one of the local services 108 or remote services 116, and generate a final result to ensure that the user receives a response in a timely manner. In yet another embodiment, the orchestration service 118 may determine whether the initial results should be shared between the local services 108 and remote services 116. For example, a result from the local service 108 may include data that should not be distributed due to a privacy policy. In such embodiments, the orchestration service 118 may prohibit the result from being transferred to the distributed network 112 or abstract the initial result to remove any protected data and send the abstracted result to the distributed network. However, in other embodiments, the remote services 116 and local services 108 may determine whether or not the initial results should be shared.

Figure 2:
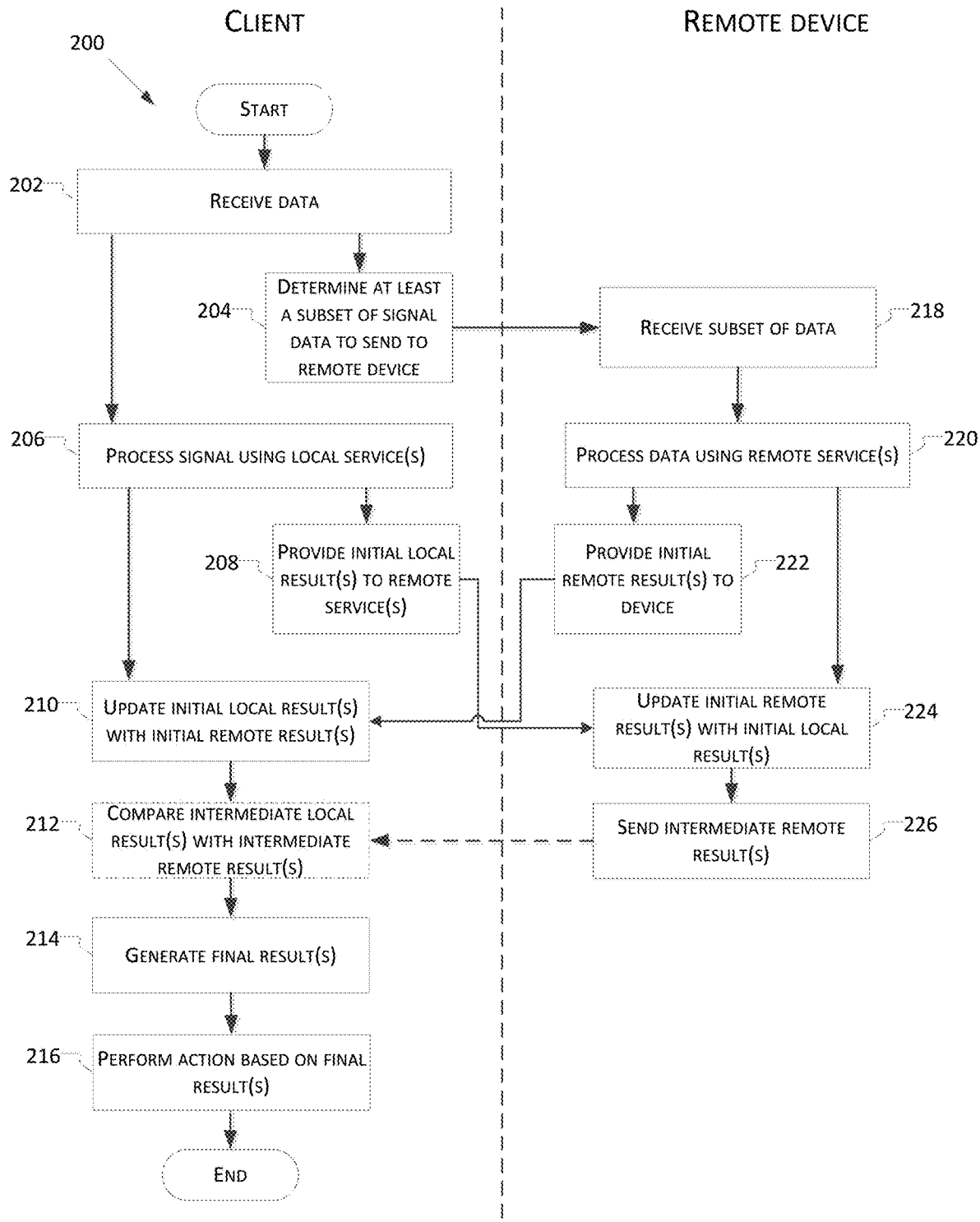
FIG. 2 is an embodiment of method 200 for shared processing data using a hybrid client/server architecture.

Having described an exemplary hybrid client/server system, the disclosure will now describe an exemplary method for the shared processing of data by a client device and distributed network. FIG. 2 is an embodiment of method 200 for shared processing data using a hybrid client/server architecture such as the architecture shown in FIG. 1. Because of the shared nature of the systems and methods disclosed herein, FIG. 2 depicts operations that are performed by both a client device and a remote device, such as a server, on a distributed network. In the illustrated embodiment, operations 202-216 are performed by a client device, such as client device 102 (FIG. 1) while operations 218-226 may be performed in parallel, in addition to, simultaneously, or substantially simultaneously, by a server computer that is part of a distributed network, such as distributed network 112 (FIG. 1).

Flow begins at operation 202 where a client device receives one or more data. In embodiments, the one or more data may be generated by a user action, such as the user interacting with an input component of the device (e.g., a keypad, a touch screen, or a microphone for identifying speech and/or music, among other components). In alternate embodiments, the one or more data received at operation 202 may be generated by a component of the client device, an application resident on the client device, and/or by a remote device or application in communication with the client device. In embodiments, flow continues to operations 204 and 206 simultaneously or substantially simultaneously. At operation 204, a determination is made to send at least a subset of the data to a distributed network for shared processing. In embodiments, if the data does not include private data, does not require capabilities that are not available to a remote service that is part of a distributed network, and is not resource intensive to transmit may be sent to the distributed network at operation 204. In alternate embodiments, the determination regarding the type of data to send may be made during operation 206, which is described in further detail below. The data, or at least a subset of the data, is received by the distributed network at operation 218. In alternate embodiments, operations 204 and 206 may be performed sequentially.

In embodiments, while determining what data to send to the distributed network at operation 204, the client device may also start processing the received data at operation 206. In embodiments, the data received at operation 202 may be related to a user request. It is generally desirable to provide a response to the user request as quickly as possible to enhance the user's experience. As such, upon receiving the data the method 200 provides, in embodiments, for the immediate processing of the data at the client device while a determination is made as to whether or not the data should be processed by the distributed network. In embodiments, the signal may be processed by one or more local services resident on the client device at operation 206. One of skill in the art will appreciate that the processing performed at operation 206 may be different base on the type of data received at operation 202. For example, in embodiments the processing the signal at operation 206 may perform an action, generate an inference, trigger an alert, perform speech recognition, or perform any other type of action or computation. Exemplary embodiments of the processing performed at operation 206 will be described in further detail with respect to FIGS. 5-11. In embodiments, the local services may be capable of utilizing client data and components to process the data at operation 206.

While the client device is processing the data at operation 206, the distributed network may process at least the subset of data at operation 220. In embodiments, a subset of the data includes some, but not all, of the data received at operation 202. Similar to operation 206, one of skill in the art will appreciate that the processing performed at operation 206 may be different base on the type of data received at operation 202. For example, in embodiments the processing the data at operation 206 may perform an action, generate an inference, trigger an alert, perform speech recognition, and/or perform any other type of action or computation. Exemplary embodiments of the processing performed at operation 206 will be described in further detail with respect to FIGS. 5-11. In embodiments, one or more remote services may utilize remote data and/or the enhanced processing power provided by the distributed network to process the subset of data at operation 220. As such, the processing performed in parallel, in addition to, simultaneously, or substantially simultaneously, by the device and remote device(s) at operations 206 and 220, respectively, leverage different data sets and/or capabilities to generate a result or determination about the data received at operation 202.

With respect to operation 206, as the client device processes the signal using local services it may generate one or more results. In embodiments, the results may be initial results that are generated during execution of operation 206. The results generated and provided at operation 208 may be determinations or conclusions generated by the local services. In further embodiments, the results may be commands, hints, or data identified or otherwise generated by the local services while processing the data. At operation 208, the initial results may be provided to the remote device. As used herein, the term initial result may refer to a partial determination and/or incomplete analysis. In other embodiments, the term initial result may refer to a primary determination or analysis that may change upon further processing. Similarly, at operation 222, the remote services may also generate initial results. The initial remote service results (also referred to herein as "remote results") may be partial conclusions, determinations, commands, hints, etc. The initial local and remote service results may be different due to the differences in processing power and data available to the different processes. In embodiments, operations 208 and 222 allow the client device and the distributed network to send results as they are generated. In other words, data may be exchanged as it is generated without requiring that the local service(s) and/or remote service(s) complete prior to exchanging data. As such, exchanging the initial results at operations 208 and 222 provide the ability for the local services and remote services to incorporate data that may otherwise be unavailable to improve processing of the data which, in turn, may provide improved results.

Upon the exchanging the initial results, flow continues from operation 206 to operation 210 and from operation 220 to operation 224. At operation 210, the local service results (also referred to herein as "local results") are updated with the initial remote service results. In one embodiment, updating the local service results with the initial remote service results may require the client device to reprocess the data and local service results using the initial remote service results as additional input. In such embodiments, the local services executed at operation 206 may be performed again using the additional data provided by the initial remote service results. In further embodiments, the initial remote service results may be received while one or more local services are still processing the data. In such instances, the one or more local services may process the initial remote service result prior to completion, thereby updating local service results without having to reprocess the data with the initial remote service results. In embodiments, updating the local service results at operation 210 may result in the generation of intermediate local service results.

Similarly, at operation 224, the remote service results are updated with the initial local service results. In one embodiment, updating the remote service results with the initial local service results may require a server device to reprocess the data, or subset of data, and remote service results with the initial local service results as an additional input. In such embodiments, the remote services executed at operation 220 may be performed again using the additional data provided by the initial local service results. In further embodiments, the initial local service results may be received while one or more remote services are still processing the data. In such instances, the one or more remote services may also process the initial local service result prior to completion, thereby updating remote service results without having to reprocess the data and initial remote service results. After updating the initial remote service results at operation 224, flow continues to operation 226 where the intermediate remote service results are provided to the client or to another component or process, such as an orchestration service (e.g., orchestration service 118 (FIG. 1)) or an arbiter, which is described herein in more detail with respect to FIGS. 8-11. In embodiments, the intermediate remote service results may be determinations, results, commands, hints, or data otherwise generated, updated, or reprocessed after receiving initial results from the local device.

Returning to the device operations, after updating the local service results at operation 210, flow continues to optional operation 212. At operation 212, the intermediate local service results may be compared with the intermediate remote service results. In embodiments, one or more local services may be executed again with the intermediate remote service results as an additional input. In another embodiment, the comparison may be performed using machine learning, a neural network, a ranking system, a scoring system, a confidence system, a Gaussian model, a classification model, or employ any other type of algorithm or model to generate the best result from the set of intermediate results. Operation 212 is described in more detail with respect to FIG. 3.

Flow continues to operation 214 where the client device generates a final result. The final result may be one of the local service results generated at operation 206 or 210. In other embodiments, the final result may be the result generated or identified at optional operation 212. In other embodiments, rather than generating a final result at operation 214, the client may receive a final result, for example, from an orchestration service or the remote device. In embodiments, the final result may comprise a single result, multiple results, or a lattice of results.

Flow continues to operation 216 where the device performs an action based upon the final result generated at operation 214. One of skill in the art will appreciate that the type of action depends upon the results generated at operation 214. For example, the device may perform an action (e.g., perform a web search, call or text a contact, display a map, make a reservation, update profile information, etc.). In other embodiments, if multiple results are determined at operation 214 that require disambiguation, at operation 216 the device may display the multiple results to a user and allow the user to select the correct result.

While FIG. 2 illustrates a single exchange of results between the client and remote device(s), in embodiments the remote device(s) and the client may exchange results and/or perform updated processing multiple times until one or both the client and remote device(s) determine that a satisfactory result has been reached. In further embodiments, depending on the type of data received, multiple exchanges of data may be performed as part of the processing operations 206 and 220 and/or updating operations 210 and 224. For example, if the received data requires speech recognition, both the client and the remote device(s) may perform speech recognition and exchange their initial results. Upon receiving the initial results, both the client and the remote device(s) may update their results. In addition to updating the results, the client and remote device(s) may also perform additional processing such as domain detection. The results generated by the domain detection may then be exchanged between the client and the remote device(s) at which time each side will again update their results. Upon completion of the domain detection, both the client and the remote device(s) may again process the result to perform further language understanding. For example, the client and remote device(s) may each analyze their results to perform intent detection, contextual determinations, entity detection, and database lookups. The results from this additional analysis may also be exchanged between the client and remote device(s), thereby allowing each side to further update results based off of the individual determinations. As such, one of skill in the art will appreciate that multiple local and remote services may be invoked and multiple exchanges may take place during the performance of the method 200.

Figure 3:
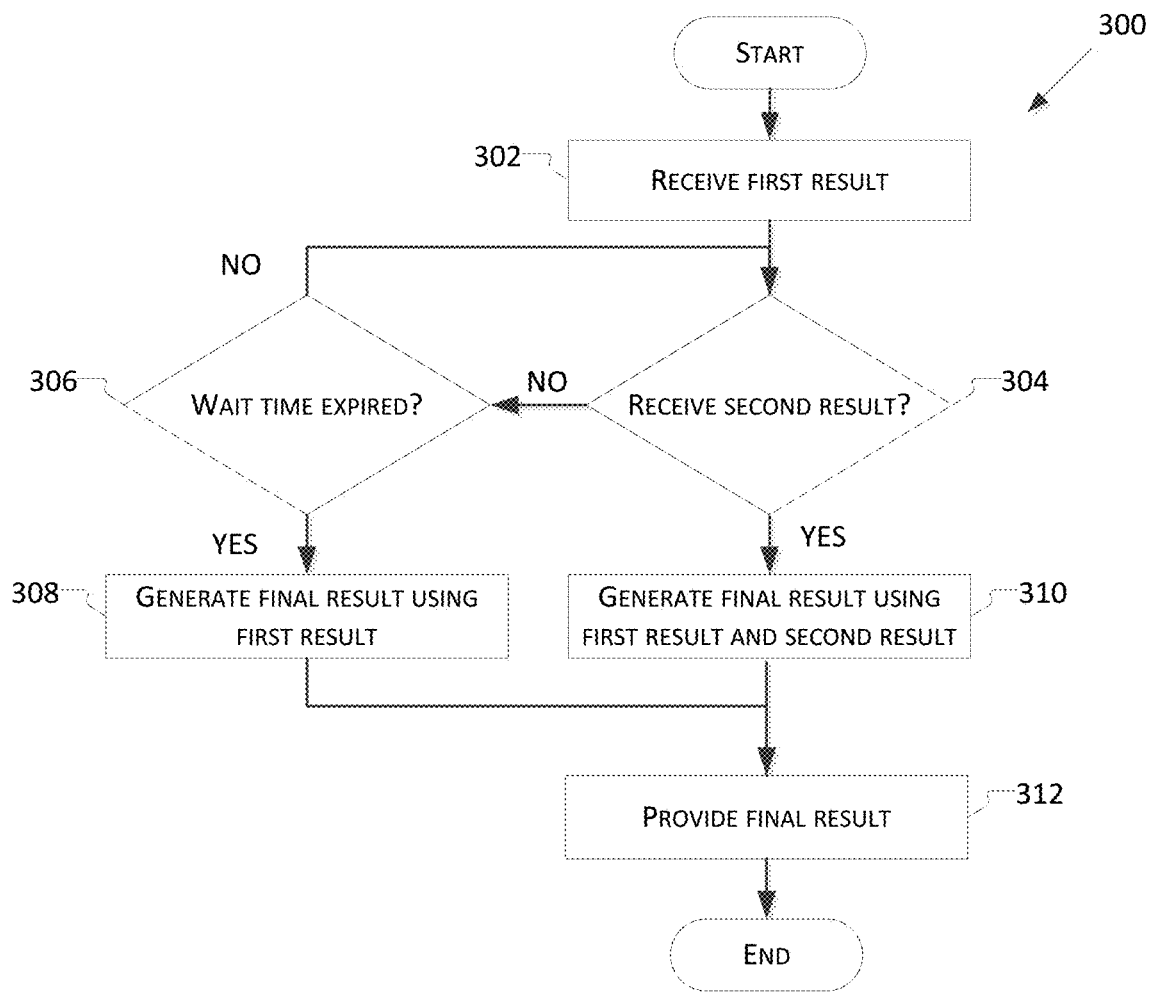
FIG. 3 is an embodiment of a method 300 of generating a final result.

FIG. 3 is an embodiment of a method 300 of generating a final result. In embodiments, the method 300 may be performed by an orchestration service or an arbiter. The method 300 may be performed by the client device, by a remote device(s) (e.g., a server) that may be part of a distributed network, or by another remote device that is neither the client nor part of the distributed network. In embodiments, the operations described in FIG. 3 may be performed at operation 212 or 214 of FIG. 2. Flow begins at operation 302 where a first result is received. In embodiments, the first result may be from a client device (e.g., generated by a local service) or the distributed network (e.g., generated by a remote service). Flow continues to determination operation 304 where the method 300 determines whether a second result has been received. In embodiments, the second result may be received by from the client or a remote device(s). If a second result has not been received, flow branches NO to operation 306.

At operation 306, the method 300 determines whether a wait time has expired. In embodiments, the result may be generated in response to a user request. In such embodiments, the user experience is degraded if the decision making process hangs or the user has to wait a long time for a result. In such embodiments, a final result may be generated using only the first result even if other results have been received in order to minimize user wait time. The wait time may be predetermined or may be dynamically determined based upon the type or request or type of result being generated. If the wait time has not expired, flow branches NO and returns to decision operation 304.

If the wait time has expired, flow branches YES to operation 308 where a final result may be generated using only the first result. In an embodiment, generating the final result may require performing additional operations on the first result. In other embodiments, generating the final result may comprise selecting the initial result, unmodified, as a final result. Flow continues to operation 312 where the final result is provided to a client device, a remote device in the a distributed network, other remote devices that are not part of a distributed network, and/or a combination of the local device, remote device in the distributed network, and other remote devices.

Returning to operation 304, if a second result has been received, flow branches YES to operation 310. At operation 310, a final result is generated based off of the first result and the second result. In one embodiment, generating the final result may comprise providing the first result and second result to a process or algorithm to generate a new final result based off of the first and second results. In another embodiment, generating the final result may comprise selecting one of the first or second results as the final result. The selection may be determined based off of machine learning, a neural network, a ranking system, a scoring system, a confidence system, a Gaussian model, a classification model, or employ any other type of algorithm or model to select the best answer. Upon generating the final result, flow continues to operation 312 where the final result is provided to a client device, a server that may be part of a distributed network, or to both.

Although FIG. 3 has been described as receiving two results, in further embodiments, more than two results may be used to generate a final result. Additionally, multiple local services and/or remote services may be used to process data. The embodiments described herein may be used to exchange data between multiple services executing on the device and/or distributed network in a substantially simultaneous manner. For example, input received by a microphone on a device can be processed by a local speech recognition process, a local music recognition process, a remote speech recognition process, and/or a remote music recognition process. The embodiments disclosed herein may be used to exchange results between the multiple processes executing simultaneously. In further embodiments, the final result generated at operation 308 or 310 may be further processed, analyzed, or combined with other results to generate additional and/or improved final results.

Having described systems and methods that represent a general hybrid client/server architecture in operation, the disclosure will now describe additional embodiments that may be employed using a hybrid client/server architecture. It may be desirable to maintain certain information on a client device. Such information may relate to personal user information, such as for example, the user's contacts, appointments, and/or location at any given time of day. However, the performance of a personal digital assistant application may be improved by identifying certain characteristics such as the likes, dislikes, and/or habits of a user. The functionality of the personal digital assistant may be further augmented by providing a mechanism in which the personal digital assistant may identify such characteristics without having to ask the user to explicitly provide and/or define the characteristics. Doing so allows the personal digital assistant application to learn about the user over time as well as adjust to changes in the user's behavior. Various inference services may be employed to identify and update characteristics about a user based upon the user's interaction with a client device, the user's locations, the user's frequent contacts, etc. However, client devices often lack the resources (e.g., processing power, available memory, etc.) required to accurately draw such inferences. A distributed network, on the other hand, has the resources to determine such inferences, but does not have the user data required to make the inferences, which may reside on the client device. To further complicate the issue, privacy policies, either defined by a user or by law, may prohibit the transfer of the personal data required to make such inferences to the a remote device. A hybrid client/server architecture may be employed to provide the resources required draw inferences while maintaining the privacy of user data.

Figure 4:
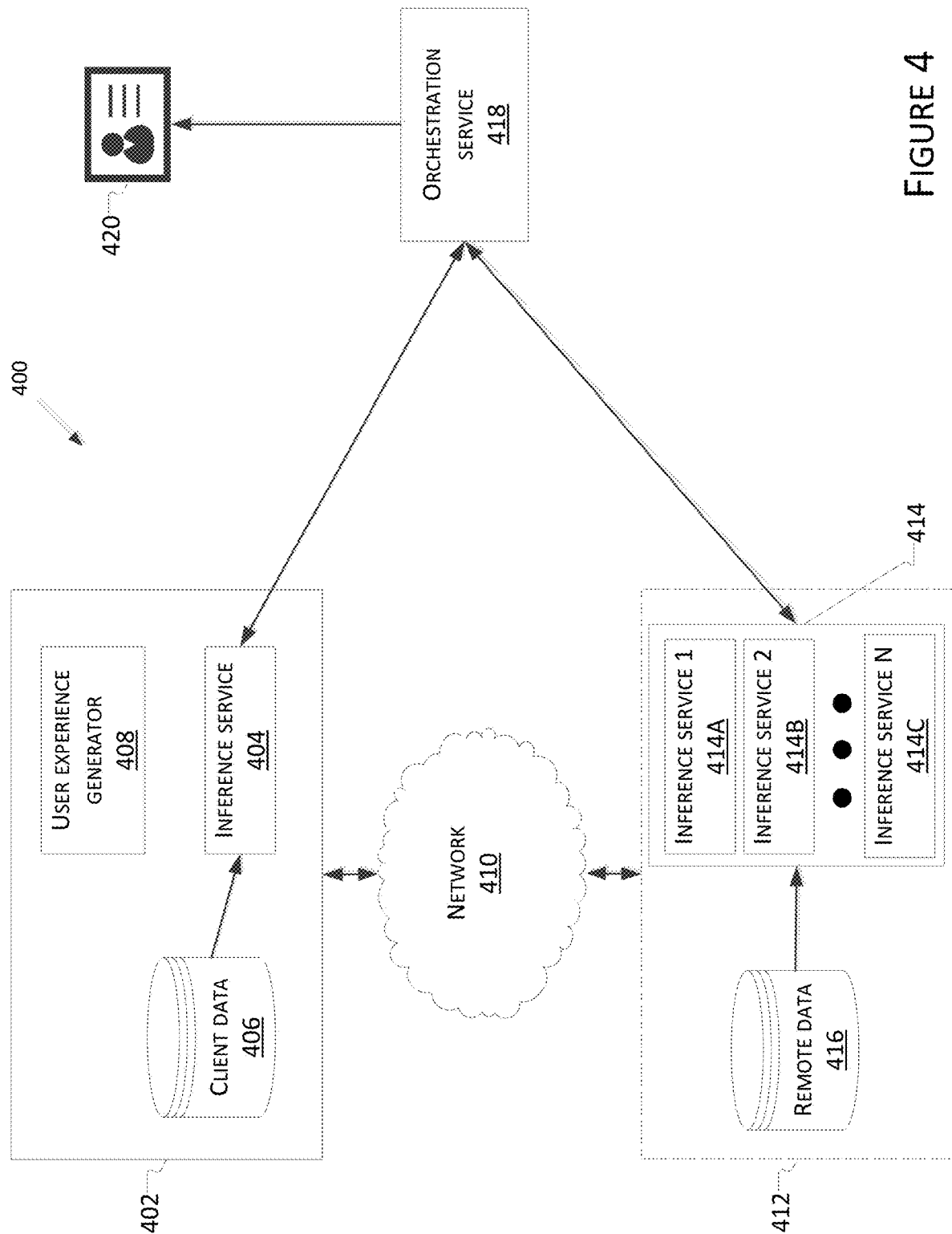
FIG. 4 is an embodiment of a hybrid client/server inferences system 400.

FIG. 4 is an embodiment of a hybrid client/server inference system 400. The hybrid client/server inference system 400 may include a client device 402 and a distributed network 410 that communicate via a communications network 410. While system 400 may include similar components as described in the hybrid client/server system 100 of FIG. 1, for ease of illustration components that operate in a manner similar to the descriptions provided in FIG. 1 are not included in FIG. 4 (e.g., the signal router 104 from FIG. 1). In embodiments, client device 402 comprises one or more inference services, such as local inference service 404. In embodiments, the local inference service 404 receives client data 406 as an input. Client data 406 includes data such as the devices location at specific points in time, user contact information, the user's schedule or appointments, and/or other types of personal input. Because local inference service 404 is located on device 402, client data 406 remains on the client device 402 and, therefore, no privacy restrictions are violated when the client data 406 is accessed by the local inference service 404. Local inference service 404 operates on the client data 406 to generate local inferences. One of skill in the art will appreciate that many different types of inference services may be employed on device 404 depending on the type of inferences that are to be determined. For example, a local inference service can be employed to identify favorite locations while a contact inference service can be employed to identify favorite contacts. The operations of the inference service may differ based upon the type of service.

As an example, a location service on a client device may regularly track the user's location at different points during the day. After acquiring a sufficient amount of location data, the location service may generate location inferences based upon the times and locations. If, over a determined time period, for example a month, the user's device is regularly located at a specific location at night, a local inference service 404 may determine that the location is the user's home. In other embodiments, the determination may not be based of time, but rather a confidence value to determine how much data may be needed to make an accurate determination. One of skill in the art will appreciate that the determination may be based on any number of factors without departing from the spirit of this disclosure. Similarly, if the user is regularly located at a specific location during the day, the inference service 404 may determine that the location is the user's workplace. A another example, if a user frequently calls, emails, and/or texts a specific contact, the inference service may identify that contact as a family member, a friend, or otherwise a contact that should be added to a favorites list. While specific examples of local inference services have been described herein, one of skill in the art will appreciate that different types of inference services may be employed without departing from the spirit of this disclosure.

While the local inference service 404 may capable of drawing limited inferences from the user's personal data and habits, the local inference service 404 often lacks the capability to draw complete inferences. For example, the local inference service 404 may identify a specific location as a user's home or workplace but it may not be able to identify the address of the home or the user's place of business. However, remote inference services 414 on the distributed network 412, such as remote inference services 414A-C, may be sophisticated enough and/or have the data required for generating more complete inferences. In embodiments, inferences generated by the local inference service 404 may be abstracted to remove personal data and sent to remote inference services 414 via communications network 410 or orchestration service 418. In one embodiment, local inference service 404 may generate abstract conclusions and send requests for further inferences from remote inference services 414. In other embodiments, the orchestration service may generate the abstractions. In alternate embodiments, the local inference service may determine a location but not be able to identify it as a home or workplace until receiving additional information from a remote inference service. For example, if a local inference service determines that a user spends the night in a location that a remote inference service (or local inference service) indicates is a shopping mall and the day in a location that the remote inference service (or local inference service) indicates is a residential area, the local inference service 404 may determine that the user works at night and the mall is the user's work while the daytime location is the user's home.

Referring back to the home and workplace examples, the location associated with the user's home may be extracted from the inference or data provided to remote inference services 414. The location information may be stripped of any personal data, such as an indication that the location is the user's home, prior to sending to the remote inference services 414. The remote inference services 404 may then leverage remote data 416 to draw further inferences and/or conclusions about the location information. In embodiments, remote data 416 may include real world data, such as, but not limited to, map data, address books, third party records, etc. The remote inference services 414 may cross reference abstracted data from the local inference service 404 with the remote data 416 to provide additional information and/or draw additional conclusions about the local inferences. For example, remote inference services 414 may perform a reverse geocode lookup on location information to identify the address of the user's home and/or workplace. In furtherance of the example, the addresses may then be cross-referenced with an address data store to identify the name of the user's workplace. By utilizing the hybrid architecture, additional information not available to the client device 402 may be inferred without transferring any personal data from the client device 402 to the distributed network 412.

The additional inference data identified by the remote inference services 414 may be provided to the orchestration service 418. The orchestration service 418 may combine local inference generated by the local inference service 404 with the additional inference information generated by the remote inference services 414 to create an updated inference. The orchestration service 418 may then store the updated inference to a user profile 420. For example, through the combination of inference information, the user profile 420 may be updated to indicate that they live at 123 ABC St., Redmond Wash. and that the user works at Microsoft.

The updated user profile 420 may be stored on the client device 402. In alternate embodiments, the user profile may be stored in the distributed network, or partially in the distributed network and the device. A User Experience (UX) generator 408 on the client device 402 may use information from the updated user profile to provide a better user experience. For example, because the user profile indicates that the user works at Microsoft, the UX generator may automatically display news stories about Microsoft to the user, automatically display a map and/or traffic information between the user's home and Microsoft in the morning and/or the evening, etc. As such, and in addition to other benefits, the hybrid client/server inferences system 400 overcomes the previously identified privacy restrictions and device limitations to provide the ability for a personal digital assistant to continually learn about a user and, therefore, provide the user with more relevant and desirable information.

Figure 5:
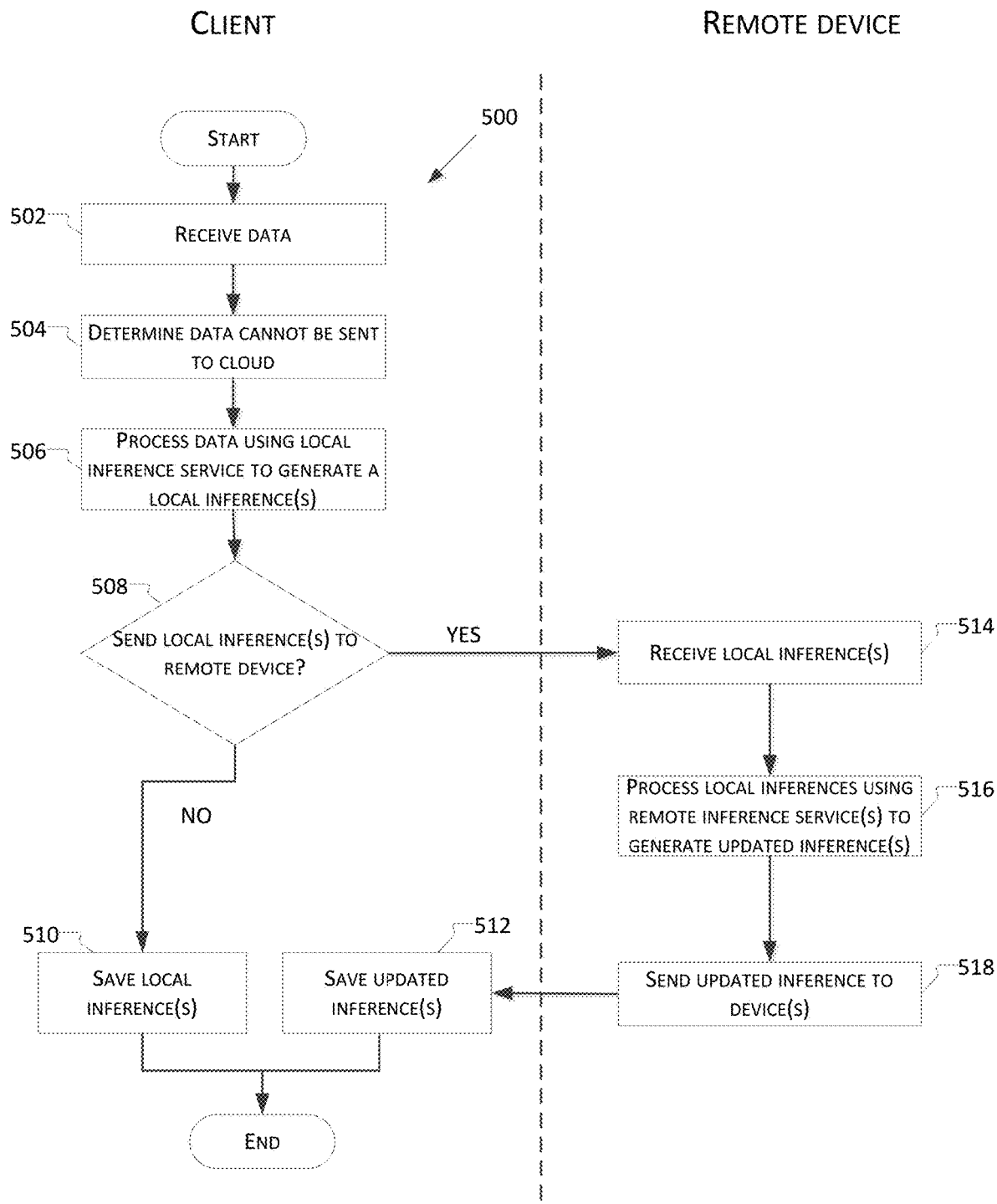
FIG. 5 is an embodiment of a method 500 for generating inferences using a hybrid client/server architecture.

FIG. 5 is an embodiment of a method 500 for generating inferences using a hybrid client/server architecture. Because of the shared nature of the systems and methods disclosed herein, FIG. 5 depicts operations that are performed by both a client device and a computing device, such as a server, on a distributed network. In the illustrated embodiment, operations 502-512 are performed by a client device, such as client device 402 (FIG. 4) while operations 514-516 may be performed in parallel, in addition to, simultaneously, or substantially simultaneously, by a server computer that is part of a distributed network, such as distributed network 412 (FIG. 4). While FIG. 5 illustrates a specific ordering, one of skill in the art will appreciate that other types of orderings may be employed by the systems and methods disclosed herein. For example, data may originate from the distributed network, from other devices, or from a combination of the distributed network, device, and/or other devices.

Flow begins at operation 502, where a client device receives one or more data. In embodiments, the one or more data may be generated by a device component (e.g., a GPS signal, an incoming call or email, etc.) or a user action, such as the user interacting with an input component of the device (e.g., a keypad, touch screen, microphone for identifying speech). In alternate embodiments, the one or more data received at operation 502 may be generated by a component of the client device, an application resident on the client device, or by a remote device or application in communication with the device. In embodiments, flow continues to operation 504. At operation 504, a determination is made that the data cannot be sent to the off of the local device. In embodiments, the data cannot be sent to the remote device because it contains protected or private data that a user preference or a privacy law prohibits from transferring off of the device.

Flow continues to operation 506 where the data is processed by one or more local inference services to generate one or more local inferences. As previously discussed, the process used to generate such inferences may differ depending on the type of inference being determined, the type of data received, and/or a combination of the type of inference and the type of data. For example, the home and workplace inferences described with respect to FIG. 4 may be generated at operation 506. After generating one or more inferences at operation 506, flow continues to decision operation 508 where a determination is made as to whether the local inferences should be sent to the remote service for further processing. For example, in embodiments, the local inferences may contain private information that cannot be abstracted or generalized. In such instances, flow branches NO to operation 510 where the local inferences are saved to a user profile that may be accessed to provide an enhanced user experience.

On the other hand, if the local inference generated at operation 506 does not contain protected or private information, or if the local inference can be further abstracted or generalized to remove protected or private data, then the local inference data is sent to the remote device and flow branches YES to operation 514 where a remote device, such as a server, that may part of a distributed network, receives the local inference data. In embodiments, the local inference data may be a conclusion or result generated by the local inference service and/or data related to the conclusion or result, such as an address, an identifier, a name, a topic (e.g., a sport, a news category, etc.). Flow continues to operation 516 where the local inference is processed by one or more remote inference services that reside on a remote device and/or in a distributed network. In an embodiment, the remote inference services in the distributed network may have access to additional data (e.g., remote data 416 (FIG. 4)) and or services (e.g., reverse geocode lookups) that are not available to the client device. The local inferences may be processed by the remote inference services to identify additional information associated with the local inference (e.g., an address, the name of a workplace, a relationship). In other embodiments, the remote inference services may identify other types of services related to the local inference (e.g., map/traffic data, news sources, third party resources, etc.). The processing by the remote inference services at operation 516 may generate an updated inference or determine additional information that may be associated with the inference (e.g., a connection to a news source or third party resource). At operation 518 the updated inference and/or information related to the local inference may be sent to the client device, where the updated inference is are saved to a user profile that may be accessed to provide an enhanced user experience.

The hybrid client/server architecture may also be employed to create composite, or hybrid, subscription services based on subscriptions local to the device and subscriptions stored in a distributed network. In embodiments, a subscription may be a service that collects information that a user may be interested and automatically provides alerts and/or information to the user without requiring the user to manually search for the information. Exemplary local subscriptions include, but are not limited to, a local alarm, location monitoring (e.g., generating alerts when the device crosses a geo-fence), calendar reminders, etc. Exemplary remote subscriptions include, but are not limited to, subscriptions to news source or sports scores, stock market updates, subscriptions to third party services (e.g., a service that monitors flight status to automatically inform a user if their flight is delayed), traffic updates, etc. Generally, the local device subscriptions are not related to the remote subscriptions. A personal digital assistant application may be enhanced by identifying local subscriptions and remote subscriptions to identify relationships between the local and remote subscriptions. The personal digital assistant application may be able to generate hybrid subscriptions that automatically relate the different subscriptions to provide an enhance subscription services. For example, a hybrid service may be created that notifies a user of newsworthy events in the user's current locality.

For example, a hybrid subscription may be composed of a local subscription that monitors the user's location and a remote subscription to a news source. The hybrid subscription may create a subscription that provides news articles related to the user's current location from the news source. The content delivered by the hybrid subscription may be dynamically altered as the user travels. In another embodiment, a hybrid subscription may interrelate multiple remote and/or local subscriptions. For example, if the user has remote subscriptions to traffic data and flight status and a local subscription monitoring a user's current location, a hybrid subscription may combine the three subscriptions into a hybrid subscription that generates an alert telling the user when she should leave for the airport based on traffic information to make sure she does not miss her flight. While specific examples of hybrid subscriptions have been described, one of skill in the art will appreciate that other types of hybrid subscriptions may be generated using a hybrid client/server architecture. In embodiments, the local subscriptions and remote subscriptions may be constructed using similar logic, thereby allowing the various subscriptions to be combined into a hybrid subscription.

Figure 6:
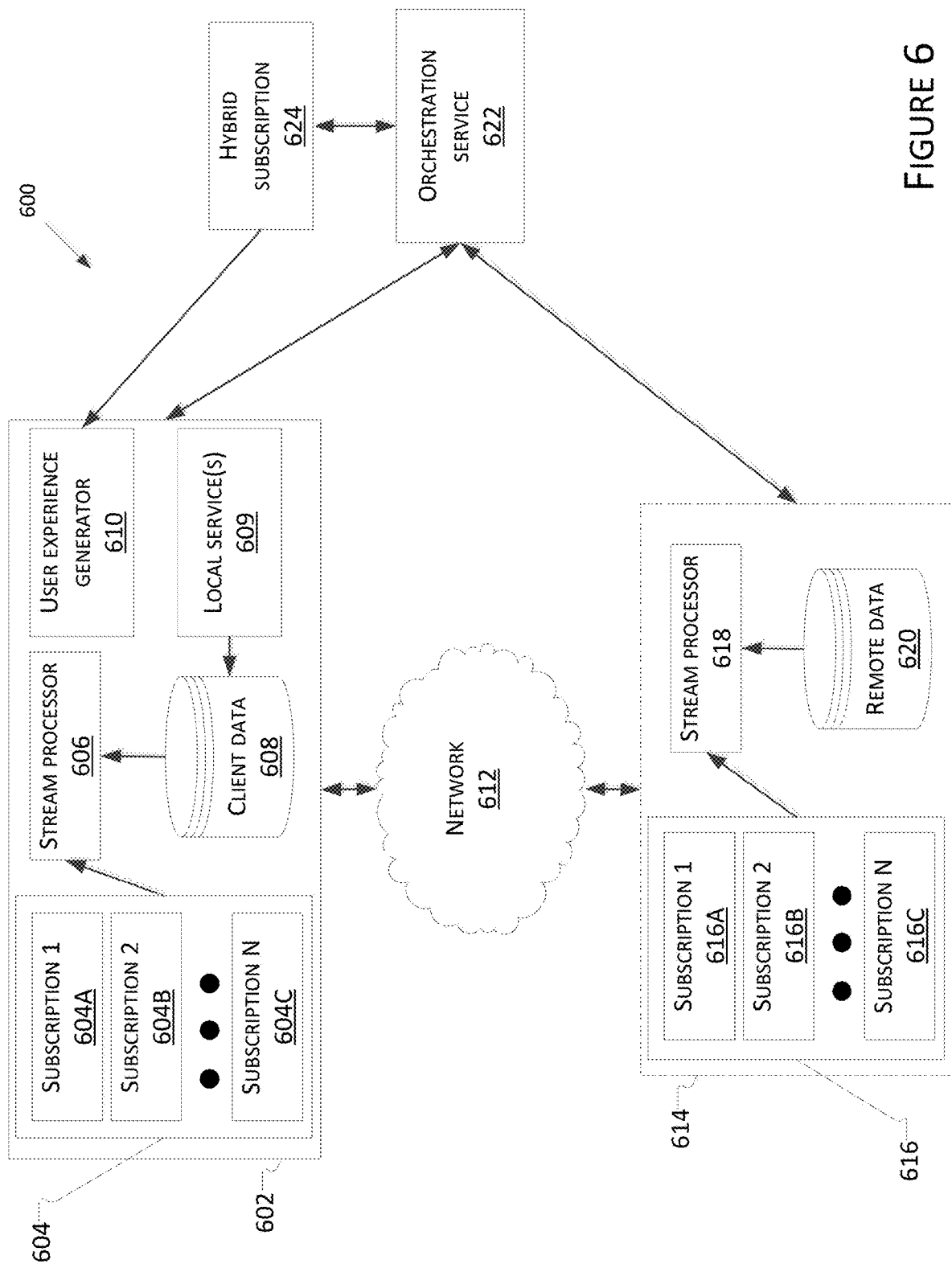
FIG. 6 illustrates an exemplary embodiment of a hybrid client/server system 600 capable of composing hybrid subscriptions.

FIG. 6 is an embodiment of a hybrid client/server system 600 capable of composing hybrid subscriptions. The hybrid client/server system 600 includes a client device 602 and a distributed network 614 communicating via a communications network 612. In embodiments, client device 602 includes a set of local subscriptions 604 comprising one or more local subscriptions (e.g., Subscriptions 604A-C). As previously discussed, exemplary local subscriptions include, but are not limited to, a local alarm, location monitoring (e.g., generating alerts when the device crosses a geo-fence), calendar reminders, etc. In embodiments, client device 602 may also include a local stream processor 606. The local stream processor may monitor the one or more subscriptions from subscription set 604 and client data 608 to determine when a subscription event has occurred. Client data 608 may include information about the client device 602 based on the device's location, user input, device time, etc. In embodiments, local service(s) 609 may be used to populate and/or generate client data 608 as described with respect to FIG. 1. Stream processor 606 compares the client data 608 to the set of device subscriptions 604 to determine when a local subscription event has occurred. An exemplary example of a local subscription even is a determination that the device has crossed a geo-fence. One of skill in the art will appreciate that various different methodologies may be employed by the stream processor to determine when a local subscription event has occurred. When a subscription event is identified, the stream processor 606 performs an action identified by the subscription event, such as generating an alert. The alert may be provided to the User Experience (UX) generator 610 to provide a notification to the user.

In embodiments, distributed network 614 includes a set of remote subscriptions containing one or more subscriptions (e.g., subscriptions 616A-C) related to the user. As previously discussed, exemplary remote subscriptions include, but are not limited to, subscriptions to a news source or sports scores, stock market updates, subscriptions to third party services (e.g., a service that monitors flight status to automatically inform a user if their flight is delayed), traffic updates, etc. Distributed network 614 may also include a remote stream processor 618 that monitors remote data 620 against remote subscriptions that are a part of remote subscription set 616 to identify a remote subscription event. In embodiments, remote data 620 may include real world data such as, but not limited to, news updates, sports scores, stock market information, or third party provided data such as flight status. An exemplary example of a remote subscription event is a determination that a flight of interest to the user has been delayed or canceled. In embodiments, remote stream processor may generate remote subscription events that are delivered to the local device 602 via communications network 612. The remote subscription may be delivered to the UX generator 610 to provide a notification to the user.

In embodiments, local subscriptions set 604 and remote subscriptions 616 may be monitored by orchestration service 622. In embodiments, orchestration services 622 may identify relationships between local subscription events and remote subscription events. The related local and remote subscriptions may be combined into one or more hybrid subscriptions 624 by the orchestration service 622. After generating the one or more hybrid subscriptions 624, the orchestration service may monitor events generated by the local stream processor 606 and remote stream processor 618 to determine when a hybrid subscription condition is triggered. When a hybrid subscription is triggered, a notification may be delivered to UX generator 610 to provide a notification to the user.

Figure 7:
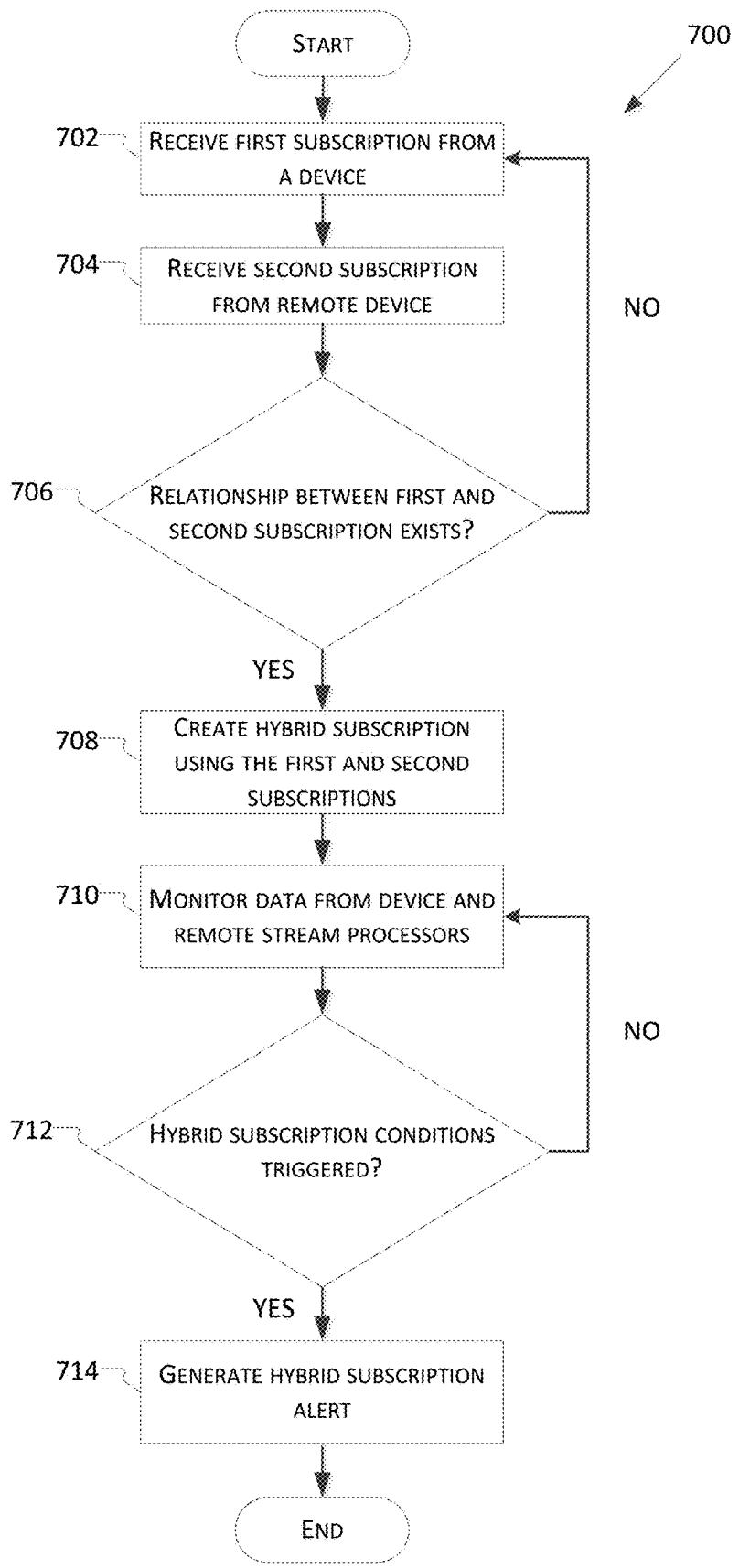
FIG. 7 illustrates an exemplary embodiment of a method 700 for generating a hybrid subscription alert.

FIG. 7 illustrates an exemplary embodiment of a method 700 for generating a hybrid subscription alert. Flow begins at operation 702 where the method receives a local subscription from a client device. As previously discussed, exemplary local subscriptions include, but are not limited to, a local alarm, location monitoring (e.g., generating alerts when the device crosses a geo-fence), calendar reminders, etc. Flow continues to operation 704 where the method 700 receives a remote subscription from one or more remote devices. Again, as previously discussed, exemplary remote subscriptions include, but are not limited to, subscriptions to news source or sports scores, stock market updates, subscriptions to third party services (e.g., a service that monitors flight status to automatically inform a user if their flight is delayed), traffic updates, etc.

After receiving the local and remote subscriptions, flow continues to operation 706 where the subscriptions are analyzed to determine whether or not a relationship exists between the subscriptions. For example, a remote subscription related to delivery of news may be related to a local subscription monitoring the client device location. The relationship may be determined based on the fact that the news subscription contains information based on locality. In embodiments, a structured representation language may be used to identify the relationship between local and remote subscriptions. The local and remote subscriptions themselves may contain expressions in a structured representation language, and, in embodiments, the expressions in the local and remote subscriptions may be evaluated against a stream of incoming events (e.g., location data from the phone, or changes in real world data—flight status changes, traffic incidents, stock ticker movements, etc.). When the conditions in an expression are met, an event may be raised that triggers an action within a process or application such as, for example, an orchestration service, and the relevant structured information may be passed from the client device to the remote device(s) (or vice versa) at that time. While specific example of a relationship has been described herein, one of skill in the art will appreciate that other types of relationships may be identified without departing from the spirit of this disclosure. If a relationship does not exist, flow branches NO and returns to operation 702 where additional subscriptions are received.

If a relationship exists, flow branches YES to operation 708. At operation 708, a hybrid subscription is created that combines related data from the local and remote subscriptions to generate hybrid subscription that associates information of interest to the user to provide additional notifications. Referring back to the previous examples, a hybrid subscription may merge a traffic data and flight status subscriptions from a remote service(s) with a local subscription monitoring a user's current location to create a hybrid subscription that combines the three subscriptions into a composite subscription capable of generating an advance alert, such as an alert that notifies the user when she should leave for the airport based on traffic information to make sure she makes her flight.

Flow continues to operation 710 where the method monitors data from both the local and remote stream processors. At decision operation 712, a determination is made as to whether a hybrid subscription condition has been triggered based upon the events generated by the local and remote stream processors. If a hybrid subscription has not been triggered, flow branches NO and returns to operation 710 and monitoring of the local and remote stream processors continue. If a hybrid subscription is triggered, flow branches YES to operation 714 where a hybrid subscription alert is generated. The hybrid subscription alert may be delivered to a UX generator of the client device to provide a notification of the hybrid subscription event to the user. One of skill in the art will appreciate that the hybrid client/architecture allows a personal digital assistant to intelligently combine information of interest to the user to provide useful related notification without requiring the user to identify complicated relationships between the various sources of information.

The hybrid client/server architecture may also be employed to perform enhanced natural language expression evaluations. Natural language expressions are commands, requests, queries, or other input that a user may provide to a client device. Natural language expressions are distinguished from a constructed language or formal language, such as a computer-programming language, that may be constrained by specific rules. In other words, an exemplary natural language expression is an utterance used in conversation (spoken or written) between two people. The utility of a personal digital assistant application may be improved though a natural language interface that allows a user to submit queries or requests (spoken or written) to the personal digital assistant application using natural language expressions. This allows the user to intuitively interact with a personal digital assistant application (or client device) rather than forcing the user to learn a rule based command structure that seems artificial and unfamiliar to the user. Furthermore, a natural language interface allows for the anthropomorphization of the personal digital assistant application which may be beneficial to foster interaction between a user and the personal digital assistant application.

One way of performing natural language recognition is utilization of a knowledge base. A natural language expression can be compared to the knowledge base which contains information, such as a grammar, that provides instructions for identifying the meaning of a natural language expression. Generally, the performance of speech recognition is benefited by having a large knowledge base accessible to a speech recognition process. Because of this, speech recognition on client devices tends to be limited. A client device, such as a smart phone or tablets, simply does not have enough memory to store a large knowledge base for speech recognition nor the processing power required to analyze a natural language expression against a large knowledge base. Because of this, the more effective speech recognition applications are generally implemented as a distributed program capable of utilizing a distributed network. This is because distributed networks have the storage capacity and processing power to store and analyze a large knowledge base for speech recognition purposes. However, large knowledge bases stored on a distributed network tend to be generalized for use across a broad spectrum of users. Because of this, it may be difficult for a speech recognition process using a generalized knowledge base to identify terms unique to an individual, such as unique names or terms that an individual regularly uses.

On the other hand, a client device, while having a significantly smaller knowledge base, may access to unique terms that an individual regularly uses, for example, via access to the user's contact store (e.g., for names), use patterns, and/or local dictionary which may be generally adapted to recognize repeated use of slang for spell checking purposes, or other forms of knowledge unique to the client device. Because of this, a natural language evaluation process residing on a client device, with access to the local knowledge base, may provide better performance with respect to identifying unique terms. Embodiments of the hybrid client/server architecture provide a system which may utilize the power and large knowledge base of a natural language evaluation process resident on a distributed network and the ability to access to unique terms and use patterns found in a local knowledge base accessible to a local natural language evaluation process.

Furthermore, embodiments of the present disclosure may be leveraged to provide third party developers the ability to provide a specialized knowledge base to aid in understanding natural language expressions unique to an application. Developing a knowledge base, such as, for example, a grammar, to aid in speech recognition is a complicated process that requires specialized skill. Because of this, third party developers often lack the experience and knowledge required to modify a shared knowledge base, such as, for example, the knowledge base of a distributed network. However, third party developers often have specialized knowledge of how users interact with their application. The hybrid client/server architecture provides the ability for a third party developer to distribute a third party knowledge base (e.g., data and or rules provided by a third party, third party grammars, third party hints, etc.) specific to an application that may be leveraged to offer guidance or hints to a speech recognition process resident on a client device or on a distributed network. For example, developers of a movie application may provide a knowledge base that identifies the natural language expression "MovieApp watch" or "MovieApp I want to watch" followed by a movie name or TV show, where the term MovieApp is the name of the application. In addition to identifying these phrases, the third party knowledge base may offer hints to a natural language evaluation process. In the provided examples, exemplary hints may be that the phrase will be followed by a movie name or a TV show. These hints may be provided to a natural language evaluation process to direct the process to a specific domain, grammar, or knowledge base that is related to movies or TV shows to help identify the movie or TV show requested by the user. As such, embodiments of the client/server architecture further enhance natural language evaluation (e.g., speech recognition, text recognition, etc.) by allowing third party developers to provide hints that may be used by both a local natural language evaluation process on the client device and a remote natural language evaluation process to interpret a natural language expression. The hints may also provide information about what actions the applications can perform (e.g., make calls, send emails, play movies) etc. Among other uses, this type of information may be used to decipher a user's intent. One of skill in the art will appreciate that hints may also be provided by first party applications, operating systems, etc. without departing from the spirit of this disclosure.

Figure 8:
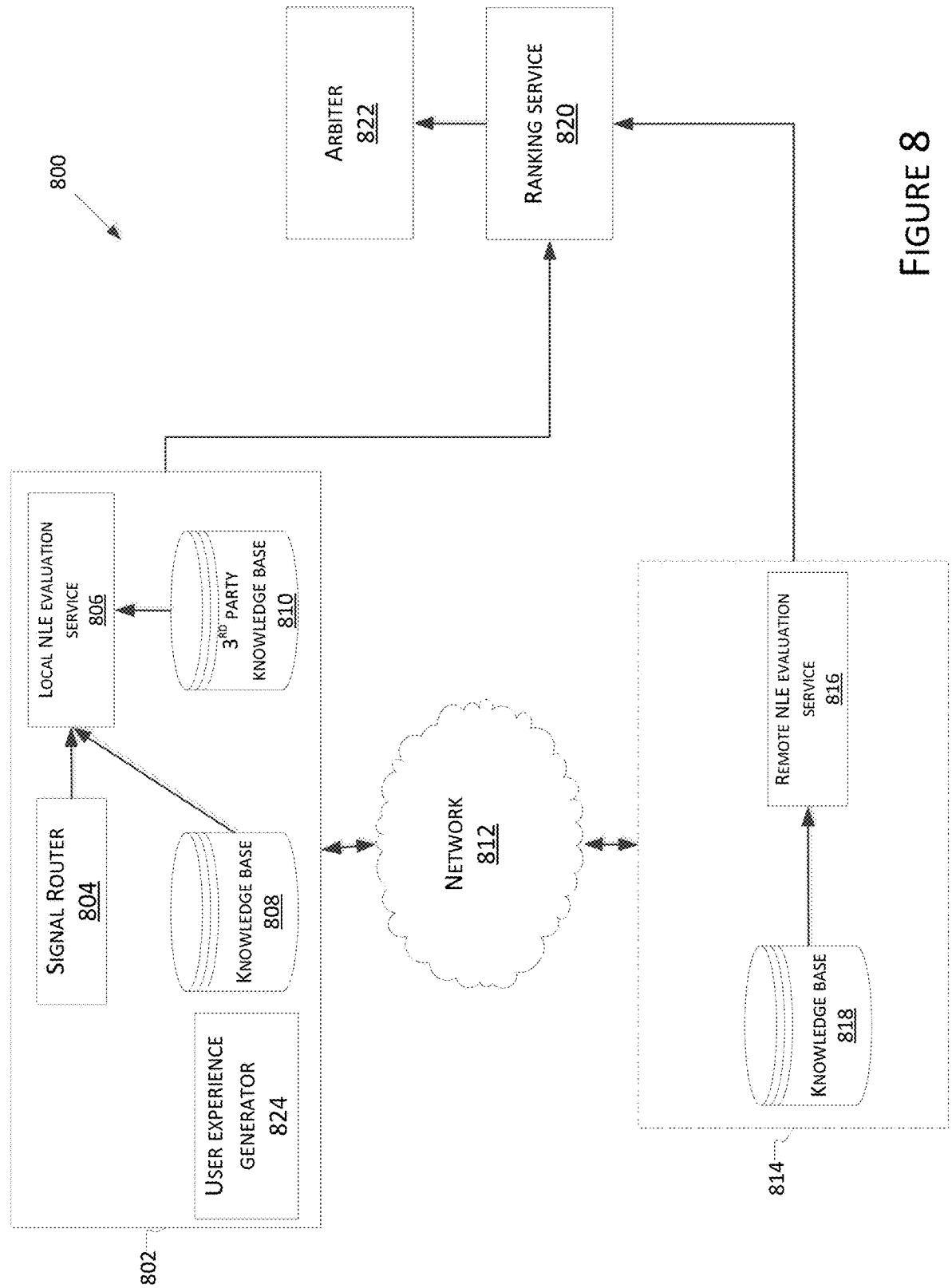
FIG. 8 is an embodiment of a hybrid client/server system 800 for enhanced speech recognition.

FIG. 8 is an embodiment of a hybrid client/server system 800 for enhanced NLE evaluation. In embodiments, a NLE evaluation process may be a speech recognition process or any other type of process capable of receiving a natural language expression as input and performing an action based upon the input. The hybrid client/server system 800 includes a client device 802 and a distributed network 814 communicating via a communications network 812. In embodiments, client device 804 includes a signal router 804 which identifies natural language expressions. A natural language expression may be in the form of textual input (e.g., the user enters the natural language expression) or a spoken utterance. In embodiments, the signal router 804 recognizes a natural language expression and sends the expression to local NLE evaluation service 806 for processing. The signal router 804 may also send the natural language expression to the remote NLE evaluation service 816 via communications network 812 to be processed in parallel, in addition to, simultaneously, or substantially simultaneously, with the local NLE evaluation service 806.

Figure 12:
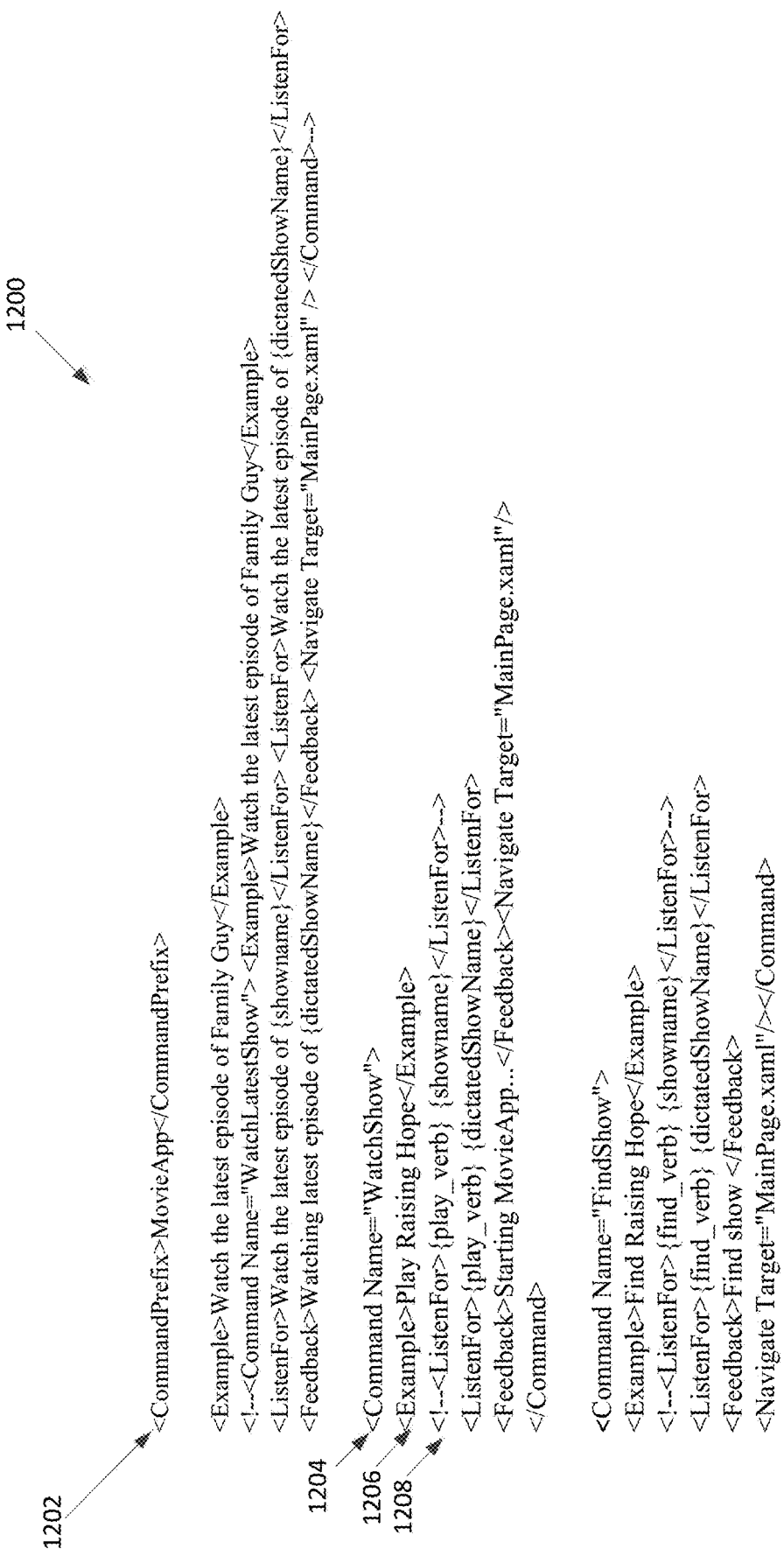
FIG. 12 is an embodiment of an exemplary third party grammar 1200 for a movie application.

Local NLE evaluation service 806 receives the natural language expression from the signal processor and loads local knowledge base 808 and third party knowledge base 810. In embodiments, local knowledge base 808 may include the user's contacts, calendar events, local dictionary, or any other local data. Local knowledge base 808 allows the local NLE evaluation process 806 to identify terms that may be unique to the user, for example, a unique last name or slang utterance. Third party knowledge base 810 may contain grammars and hints provided by third party application developers that aid the local recognizer 806 in identifying utterances related to a specific application. FIGS. 12 and 13 illustrate exemplary embodiments of third party grammars. For example, FIG. 12 is an embodiment of an exemplary third party grammar 1200 for a movie application. The third party grammar 1200 may identify a command prefix 1202 that identifies a specific application. For example, command prefix 1202 identifies the application "MovieApp." In addition to identifying the application, the third party grammar may identify various examples of natural language expressions that are related application commands. For example, grammar 1200 identifies the application "WatchShow" command 1204 followed by an exemplary natural language expression "Play Raising Hope" 1206 which indicates the "WatchShow" command. In addition to identifying an exemplary natural language expression 1206, the third party grammar 1200 provides hints 1208, or instructions, to guide a NLE evaluation process attempting to interpret the natural language expression. In embodiments, the hints are not the constraints employed by classic NLE evaluation systems. Instead, the hints may be information used to guide a NLE evaluation process (e.g., a NLE service). FIG. 13 illustrates yet another exemplary third party grammar 1300 for a communications application. While exemplary third party grammars have been disclosed, one of skill in the art will appreciate that other third party grammars, hints, definitions, etc. may be employed with the embodiments disclosed herein. For example, a third party grammar may be provided for different types of applications or have a format other than a markup language document without departing from the spirit of this disclosure.

The local NLE service 806 may utilize the local knowledge base 808 and the third party knowledge base 810 to parse and interpret the natural language expression received from the signal router. While the local NLE evaluation service 806 is processing the natural language expression, it may send initial results to the User Experience (UX) generator 824 to display the initial processing results to the user. Additionally, the local NLE evaluation service 806 may share its initial processing results, such as, for example, the identification of unique contact names or third party application hints, with the remote NLE service 816.

Distributed network 814, in embodiments, may include a remote NLE service 816 that processes the natural language expression received from the signal router 804 in parallel, in addition to, simultaneously, or substantially simultaneously, with the local NLE service 806. Remote NLE service 816 may utilize information stored in the remote knowledge base 818. As previously described, the remote knowledge database may be much more extensive than the local knowledge database, thereby providing additional grammars and hints that the remote NLE service 816 may rely upon to perform enhanced NLE evaluation. Additionally, the remote NLE evaluation service 816 may also receive information from a third party knowledge base (e.g., third party grammars, hints, definitions, etc.) that may be used during an NLE evaluation. Because in embodiments the remote NLE service 816 processes the natural language expression in parallel, simultaneously, or substantially simultaneously, with the local NLE service 806, the two processes may exchange initial results which can be incorporated by each of the NLE evaluation services to aid in the interpretation of the natural language expression.

Hybrid client/server NLE evaluation system 800 may also include a ranking service 820. The ranking service 820 may be resident on the client device 802, the distributed network 814, on another device, and/or across multiple devices (e.g., on both the client device 802 and the distributed network 814). In embodiments, the ranker 820 receives results from the local NLE service 806 and the remote NLE service and merges the results. In embodiments, the ranker may utilize machine learning, a neural network, a ranking system, a scoring system, a confidence system, a Gaussian model, a classification model, or employ any other type of algorithm or model to merge and rank the results from each of the processors. The ranked results may be provided to an arbiter 822 that, based on the results from the ranking service 820, identifies the best result or determines if ambiguity exists. Similar to the ranking service 820, the arbiter 822 may utilize machine learning, a neural network, a ranking system, a scoring system, a confidence system, a Gaussian model, a classification model, or employ any other type of algorithm or model to determine whether an result has been reached or whether the results require disambiguation from a user. In embodiments, disambiguation may be required if the results can be interpreted across multiple domains. In embodiments, whether a single result or multiple ambiguous results have been identified by arbiter 822, the result or results are provided to the UX generator 822 for presentation to the user. If ambiguity exists, the UX generator 822 may provide for displaying multiple results to a user and receiving selection a proper result from a list of ambiguous results.

Figure 9:
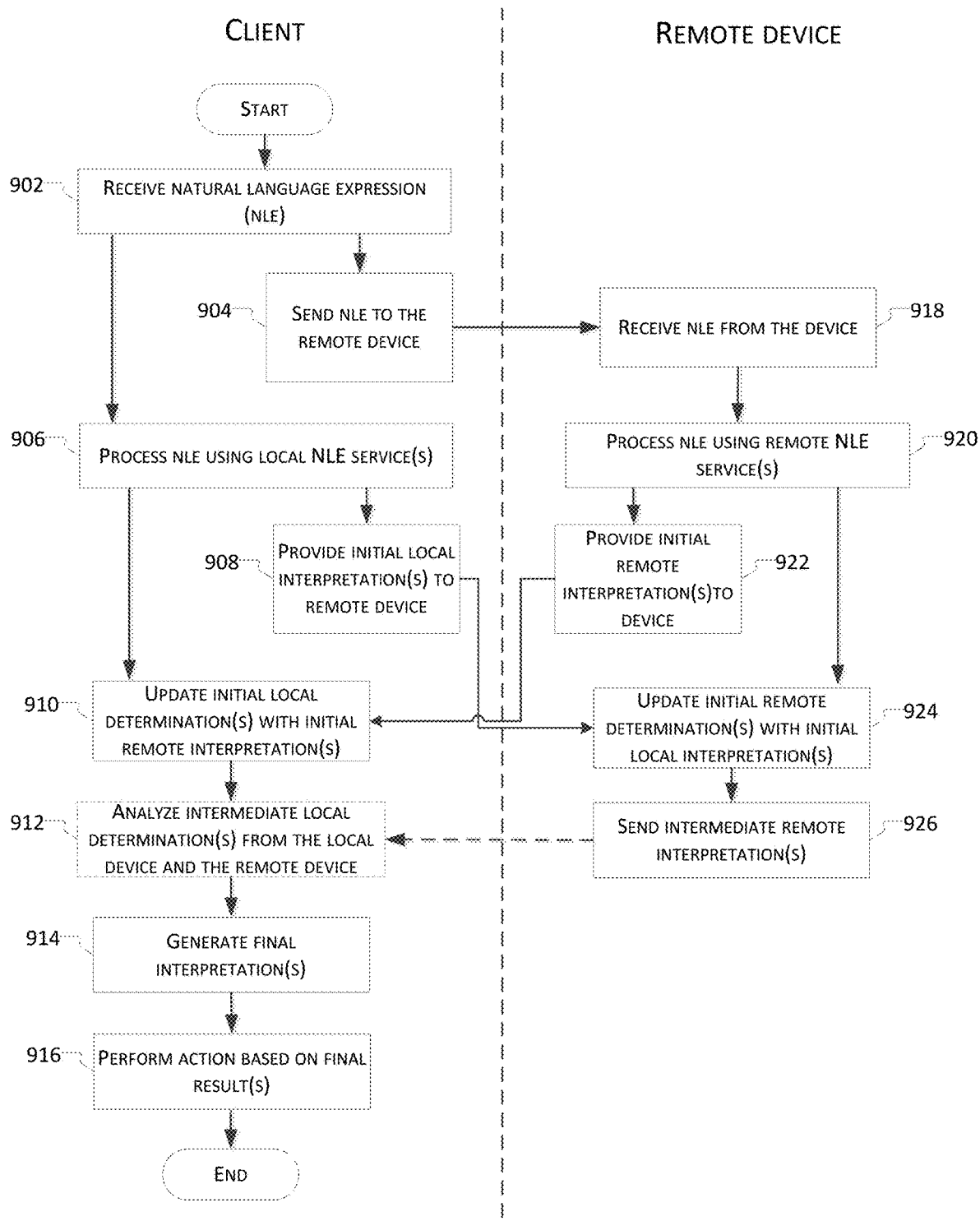
FIG. 9 is an embodiment of method 900 for the shared processing of speech using a hybrid client/server architecture.

The hybrid client/server NLE evaluation system 800 merges the ability of having a unique knowledge base available to a local NLE service 806 with the enlarge knowledge base of a remote NLE service 816 to enhance the results of NLE evaluation. FIG. 9 is an embodiment of method 900 for the shared processing of speech using a hybrid client/server architecture. Because of the shared nature of the systems and methods disclosed herein, FIG. 9 depicts operations that are performed by both a client device and a remote device, such as a server, that may be part of a distributed network. In the illustrated embodiment, operations 902-916 are performed by a client device, such as client device 802 (FIG. 8) while operations 918-926 may be performed in parallel, in addition to, simultaneously, or substantially simultaneously, by a remote device that may be part of a distributed network, such as distributed network 814 (FIG. 8).

Flow begins at operation 902 where a client device receives one or more natural language expressions. The natural language expressions may be a spoken utterance or textual expression. In embodiments, flow continues to operations 904 and 906 simultaneously or substantially simultaneously. In alternate embodiments, operations 904 and 906 may be performed serially. At operation 904, the natural expression may be sent to a distributed network for processing. In order to provide immediate feedback to a user, the client device may also start processing the natural language expression locally using one or more local NLE services at operation 906. In alternate aspects, other types of recognition processes may be employed alternatively or in addition to the NLE evaluators (e.g., music recognition processes, text recognition processes, translation processes, etc.). The local NLE services may use a unique local knowledge base and/or a third party provided knowledge base to interpret the natural language expression. During local processing, the initial local determinations generated by the one or more local speech recognition processes may be provided to one or more remote NLE services at operation 908. An embodiment of the processing performed by the local NLE evaluation processes performed at operations 906 and 908 is described in more detail with respect to FIG. 11.

While the client device is processing the natural language expression at operation 906, the remote device(s) may process the natural language expression in parallel, in addition to, simultaneously, or substantially simultaneously, at operation 920. In embodiments, the remote NLE evaluation service(s) may utilize an extensive remote knowledge base and/or the enhanced processing power provided by a distributed network to process the subset of data at operation 920. As such, the processing performed in parallel, in addition to, simultaneously, or substantially simultaneously, by the device and remote device at operations 906 and 920, respectively, leverage different knowledge bases and capabilities to generate a result or interpretation about the natural language expression received at operation 902. Furthermore, initial results generated by client NLE evaluation service(s) at operation 906 and the remote NLE evaluation service(s) at operation 920 may be exchanged, as illustrated by operations 908 and 922. As such, exchanging the initial results at operations 908 and 922 provide the ability for the local NLE service(s) and remote NLE services to incorporate interpretations based on different knowledge bases that would otherwise be unavailable to the different services in order to improve speech recognition by both the local and remote NLE services.

Using the exchanged initial results, flow continues from operation 906 to operation 910 and from operation 920 to operation 924. At operation 910, the local interpretations may be updated based upon the initial remote interpretations of the natural language expression. In one embodiment, updating the local interpretations with the initial remote interpretations may require the client device to reprocess the data and local service results using the initial remote service results as an additional to the local NLE services. In such embodiments, the local NLE services executed at operation 906 may be performed again using the interpretation provided by the remote NLE services. In further embodiments, the initial remote interpretations may be received while one or more local NLE services are still processing the natural language expression. In such instances, the one or more local NLE services may additionally process the initial remote interpretations prior to completion, thereby updating local service results without having to reprocess the natural language expression in light of the initial remote determinations. In embodiments, updating the local service results at operation 920 may result in the generation of intermediate local interpretations.

Similarly, at operation 924, the initial remote interpretations may be updated with the initial local interpretations to generate intermediate remote interpretations. After updating the initial remote NLE evaluation service results at operation 924, flow continues to operation 926 where the intermediate remote NLE evaluation service results are provided to the client and/or to another component or process, such as a ranking service and/or an arbiter.

Returning to the device operations, after updating the local service results at operation 910, flow continues to optional operation 912. At operation 912, the intermediate local interpretations may be compared and/or merged with the intermediate remote interpretations. Operation 912 is described in more detail with respect to FIG. 10.

Flow continues to operation 914 where the client device generates a final result. In one embodiment, the final result may be one of the local interpretations generated at operation 908 or 910. In other embodiments, the final result may be the interpretations generated or selected at optional operation 912. In other embodiments, rather than generating a final interpretation at operation 914, the client may receive a final interpretation, for example, from an arbiter or a remote device. In embodiments, the final result may comprise a single interpretation or multiple interpretations that require disambiguation by the user. Flow continues to operation 916 where the device performs an action based upon the final interpretation generated at operation 914.

Figure 10:
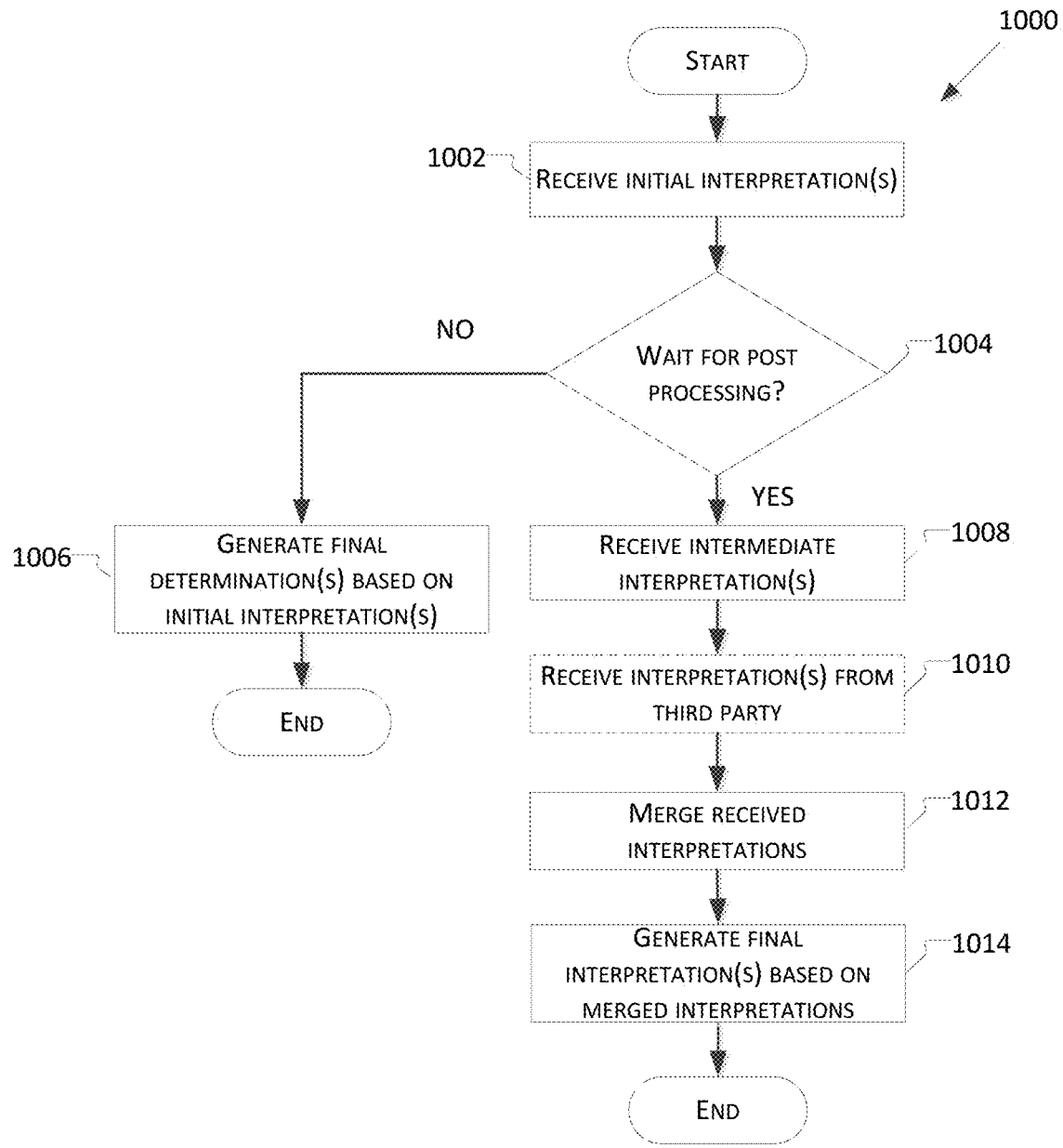
FIG. 10 is an embodiment of a method 1000 for selecting or generating one or more interpretations of a natural language expression.

FIG. 10 is an embodiment of a method 1000 for selecting or generating one or more interpretations of a natural language expression. In embodiments, the method 1000 may be performed by a ranking service, an arbiter, or a component that combines the operations of a ranking service and arbiter. The method 1000 may be performed by a client device, a remote computing device that is part of a distributed network, or another device in communication with the client device and/or the remote device. In embodiments, optional operation 912 of FIG. 9 may perform the operations of method 1000. Flow begins at operation 1002 where one or more initial determinations are received. The one or more initial determinations may be received from a local NLE service on a client device, a remote NLE service executed on a remote device that may be part of a distributed network, or both.

Flow continues to decision operation 1004. At operation 1004 the method 1000 determines whether it should wait for post processing from one or more natural language evaluation services. In embodiments, if the initial interpretations are determined to be accurate with a high confidence value, it may be unnecessary to perform additional processing of the natural language expression. In another embodiment, if there is significant network lag or if a timer has expired, it may negatively impact user's experience to wait for additional processing. Under those circumstances, flow branches NO to operation 1006 where a final interpretation may be generated based upon the initial results. Generating a final interpretation or interpretations may comprise selecting one or more of the initial interpretations or merging the initial interpretations to produce one or more new interpretations. Generation of the final interpretation(s) may be performed using machine learning, a neural network, a ranking system, a scoring system, a confidence system, a Gaussian model, a classification model, or employ any other type of algorithm or model known to the art.

Returning to operation 1004, if additional processing is required flow branches YES to operation 1008 where one or more intermediate interpretations are received. The one or more intermediate determinations may be received from a local NLE evaluation service on a client device, a remote NLE evaluation service on a remote device, or both. Flow continues to optional operation 1010 where additional interpretations may be received from a third party. For example, the natural language expression, or parts of the expression, may be submitted to a third party, such as a search engine or a proprietary knowledge base, for additional interpretation. In such circumstances, third party interpretations may be received at operation 1010.

Flow continues to operation 1012 where the initial interpretations, intermediate interpretations, and/or third party interpretations are merged. Machine learning techniques, a neural network, a ranking system, a scoring system, a confidence system, a Gaussian model, a classification model, or any other type of algorithm or model known to the art may be used to merge the results at operation 1012. In an embodiment, merging the results may generate one or more ranked interpretations. The interpretations may be ranked by confidence value, domain scores, etc. Flow continues to operation 1014 where one or more final results are generated from the merged results. In one embodiment, generating a final interpretation may comprise selecting the highest ranked score. In other embodiments, further processing may be performed on the ranked results to generate one or more final results.

Figure 11:
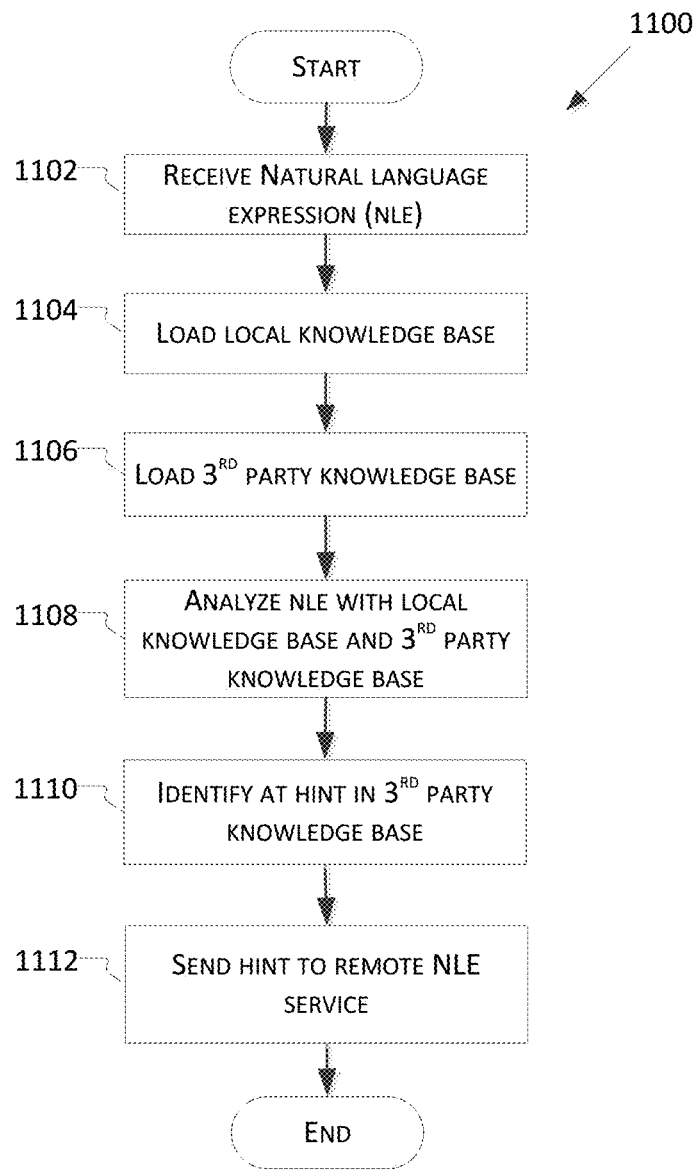
FIG. 11 is an embodiment of a method 1100 for identifying third party hints during speech recognition.

FIG. 11 is an embodiment of a method 1100 for identifying third party hints during NLE evaluation. The method 1100 may be performed by a local NLE evaluation process on a client device. In embodiments, the method 1100 may be performed during operations 906 and 908 described in FIG. 9. Flow begins at operation 1102 where a natural language expression is received. The natural language expression may be a vocal utterance or textual input. Flow continues to operation 1104 where a local knowledge base is loaded. In embodiments, the local knowledge base may include information unique to a local device. Exemplary data that may be included in a local knowledge base may be, but is not limited to, user contact, user calendar information, local dictionary entries, local messages, texts, call, etc.

Flow continues to operation 1106 where a third party knowledge base is loaded. In embodiments, the third party knowledge base may include grammars or hints generated by third party developers. In embodiments, the third party grammars may be installed with an application on a client device. Furthermore, the grammars may be continually updated by the third party developers when an application is updated. Exemplary third party grammars are provided in FIGS. 12-13. The third party knowledge base provides application developers with the ability to aid the interpretation of natural language expressions related to their applications. This allows the user to naturally interact with their applications without requiring the third party developers to develop or modify a NLE evaluation process.

Flow continues to operation 1108 where the local NLE service analyzes the natural language expression using both the local knowledge base and the third party knowledge base. The third party knowledge base may include prefixes that direct the local NLE evaluation to evaluate specific application grammars. One example of such prefixes may be an application name. When a grammar from the application is identified as relevant by the local NLE evaluation process, flow continues to operation 1110 where the natural language expression may be evaluated against the application grammar to identify a hint. Exemplary hints include identifiable phrases followed by an indicator for a NLE service on how to continue evaluation of the expression. For example, the exemplary grammar 1200 of FIG. 12 provides an example of a natural language expression that includes the word "Play." According to the grammar, if the verb "Play" is recognized, a NLE evaluation should identify a show name or diction of a show name following the verb "play." In embodiments, upon receiving the hint, the local recognizer may load a grammar related to show names or movie names, thereby increasing the probability that the NLE service correctly interprets the command. While embodiments herein have been described with respect to recognizing a verb, other components of a natural language expression may be recognized such as, for example, a phrase (e.g., a movie name), a numeric sequence (e.g., a telephone number or zip code), etc.

Upon identifying one or more hints, the hints may be sent to a remote NLE evaluation service at operation 1112. As previously described, a remote NLE evaluation service may leverage additional processing power and larger knowledge bases to perform advanced recognition techniques. Sending third party hints to a remote NLE evaluation service in provides additional information to the remote NLE evaluation service that directs the process to a relevant domain or grammar Thus, the remote NLE service may be enhanced by the third party knowledge base stored on a client device by sending hints. In other embodiments, the third party knowledge base may be stored at a remote device which may be part of a distributed network. In such embodiments, the client device may identify the third party knowledge base that is part of a distributed network that the third party NLE evaluation process should use.

Figure 14:
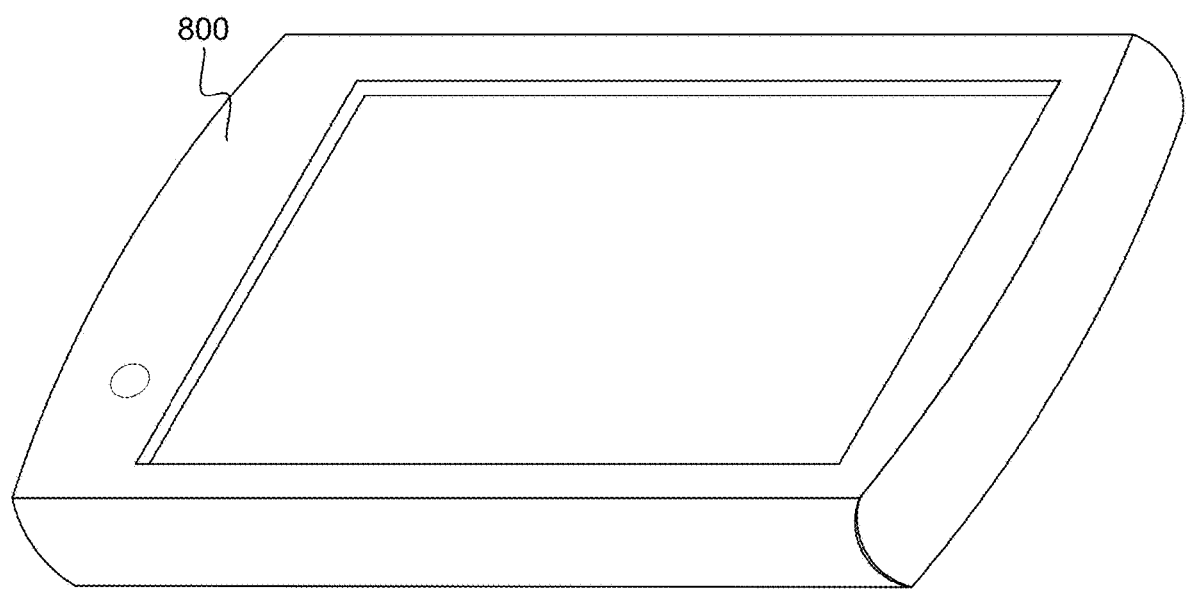
FIG. 14 illustrates a tablet computing device for executing one or more embodiments of the present disclosure.
Figure 15:
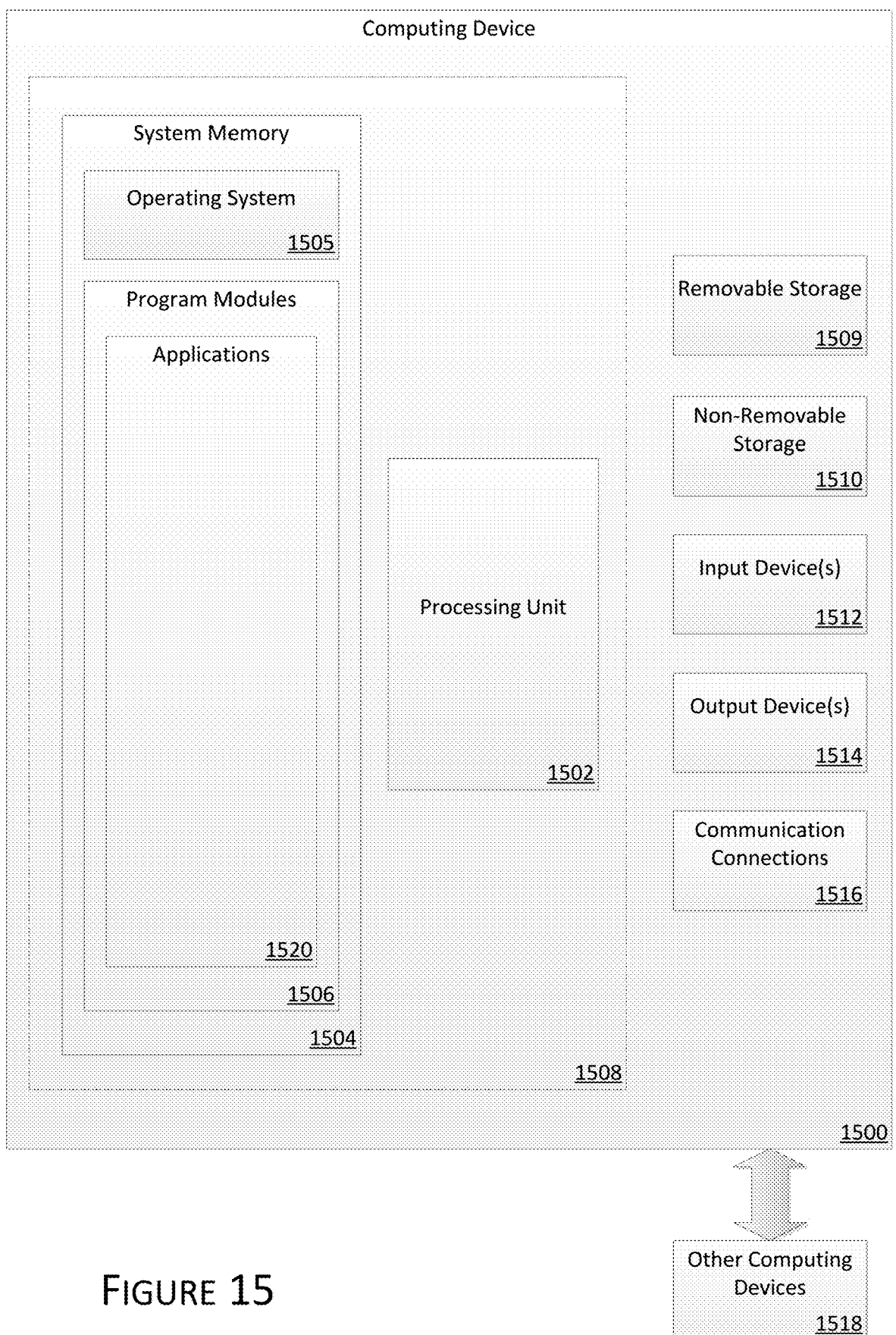
FIG. 15 illustrates a block diagram of a computing environment suitable for implementing one or more embodiments disclosed herein.

Having described various embodiments of systems and methods that utilize a hybrid client/server architecture, the disclosure will now describe various computing devices and operating environment that may be used to implement such systems and methods. FIG. 14 illustrates an exemplary tablet computing device 1400 that may execute one or more embodiments disclosed herein. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 15 through 17 and the associated descriptions provide a discussion of a variety of operating environments in which embodiments of the present disclosure may be practiced. However, the devices and systems illustrated and discussed with respect to FIGS. 15 through 17 are for purposes of example and illustration and are not limiting of a vast number of computing device configurations that may be utilized for practicing embodiments of the present disclosure, described herein.

FIG. 15 is a block diagram illustrating exemplary physical components of a computing device 1500 with which embodiments of the present disclosure may be practiced. The computing device components described below may be suitable for the computing devices described above. In a basic configuration, the computing device 1500 may include at least one processing unit 1502 and a system memory 1504. Depending on the configuration and type of computing device, the system memory 1504 may comprise, but is not limited to, volatile storage (e.g., random access memory), non-volatile storage (e.g., read-only memory), flash memory, or any combination. The system memory 1504 may include an operating system 1505, one or more program modules 1506, which are suitable for running applications 1520. The operating system 1505, for example, may be suitable for controlling the operation of the computing device 1500. Furthermore, embodiments of the present disclosure may be practiced in conjunction with a graphics library, other operating systems, or any other application program and is not limited to any particular application or system. This basic configuration is illustrated in FIG. 15 by those components within a dashed line 1508. The computing device 1500 may have additional features or functionality. For example, the computing device 1500 may also include additional data storage devices (removable and/or non-removable) such as, for example, magnetic disks, optical disks, or tape. Such additional storage is illustrated in FIG. 15 by a removable storage device 1509 and a non-removable storage device 1510.

As stated above, a number of program modules and data files may be stored in the system memory 1504. While executing on the processing unit 1502, the program modules 1506 may perform processes including, for example, one or more of the stages of the methods described herein. The aforementioned process is an example, and the processing unit 1502 may perform other processes. Other program modules that may be used in accordance with embodiments of the present disclosure may include electronic mail and contacts applications, word processing applications, spreadsheet applications, database applications, slide presentation applications, drawing or computer-aided application programs, location applications, etc.

Generally, consistent with embodiments of the present disclosure, program modules may include routines, programs, components, data structures, and other types of structures that may perform particular tasks or that may implement particular abstract data types. Moreover, embodiments of the present disclosure may be practiced with other computer system configurations, including hand-held devices, multiprocessor systems, microprocessor-based or programmable consumer electronics, minicomputers, mainframe computers, and the like. Embodiments of the present disclosure may also be practiced in distributed computing environments where tasks are performed by remote processing devices that are linked through a communications network. In a distributed computing environment, program modules may be located in both local and remote memory storage devices.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the present disclosure may be practiced via a system-on-a-chip (SOC) where each or many of the components illustrated in FIG. 15 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may be operated via application-specific logic integrated with other components of the computing device 1500 on the single integrated circuit (chip). Embodiments of the present disclosure may also be practiced using other technologies capable of performing logical operations such as, for example, AND, OR, and NOT, including but not limited to mechanical, optical, fluidic, and quantum technologies. In addition, embodiments of the present disclosure may be practiced within a general purpose computer or in any other circuits or systems.

Embodiments of the present disclosure, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. The system memory 1504, the removable storage device 1509, and the non-removable storage device 1510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other tangible medium which can be used to store information and which can be accessed by the computing device 1500. Any such computer storage media may be part of the computing device 1500. The computing device 1500 may also have one or more input device(s) 1512 such as a keyboard, a mouse, a pen, a sound input device, a touch input device, etc. The output device(s) 1514 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The computing device 1500 may include one or more communication connections 1516 allowing communications with other computing devices 1518. Examples of suitable communication connections 1516 include, but are not limited to, RF transmitter, receiver, and/or transceiver circuitry; universal serial bus (USB), parallel, or serial ports, and other connections appropriate for use with the applicable computer readable media.

Figure 16A:
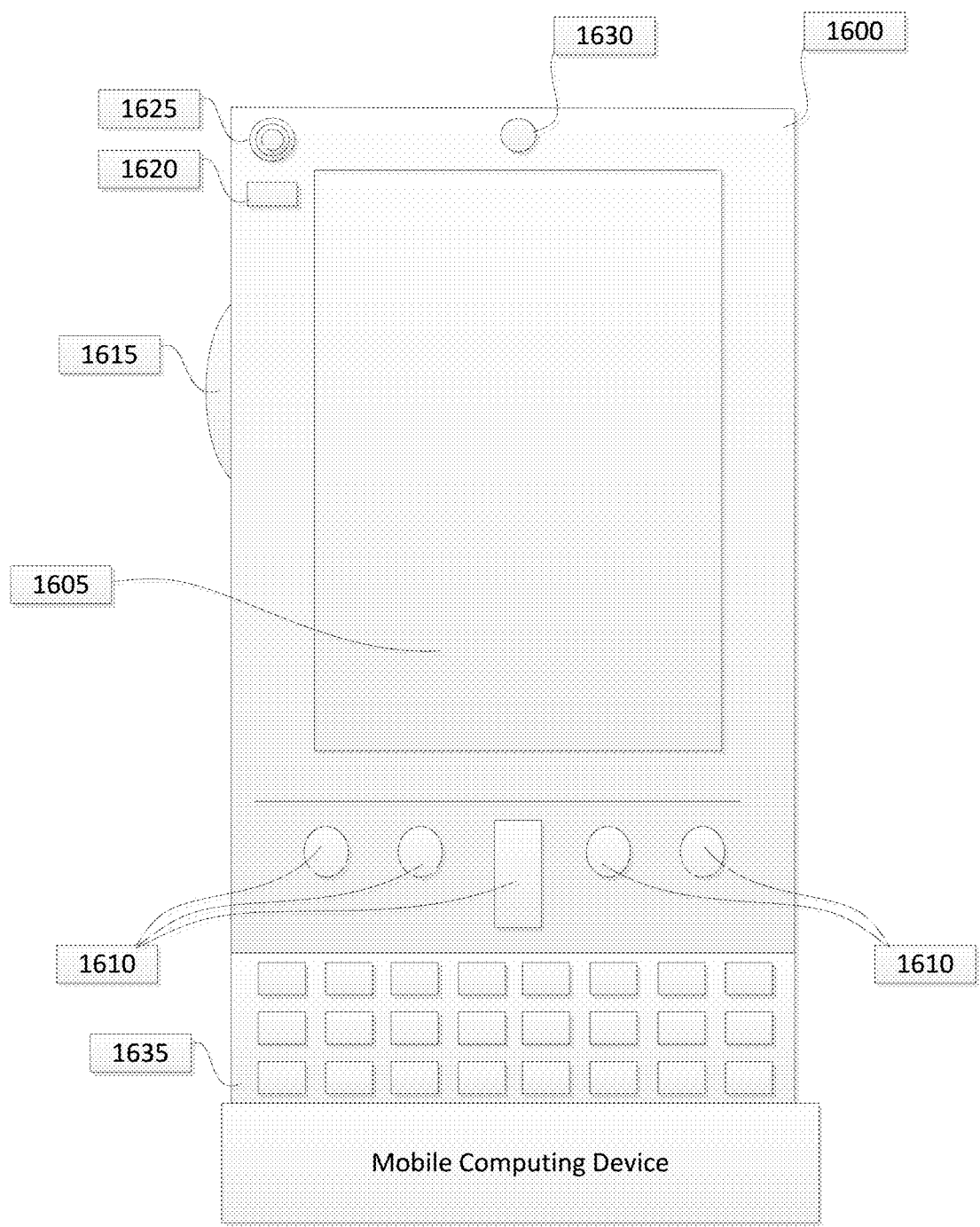
FIG. 16A illustrates one embodiment of a mobile computing device executing one or more embodiments disclosed herein.
Figure 16B:
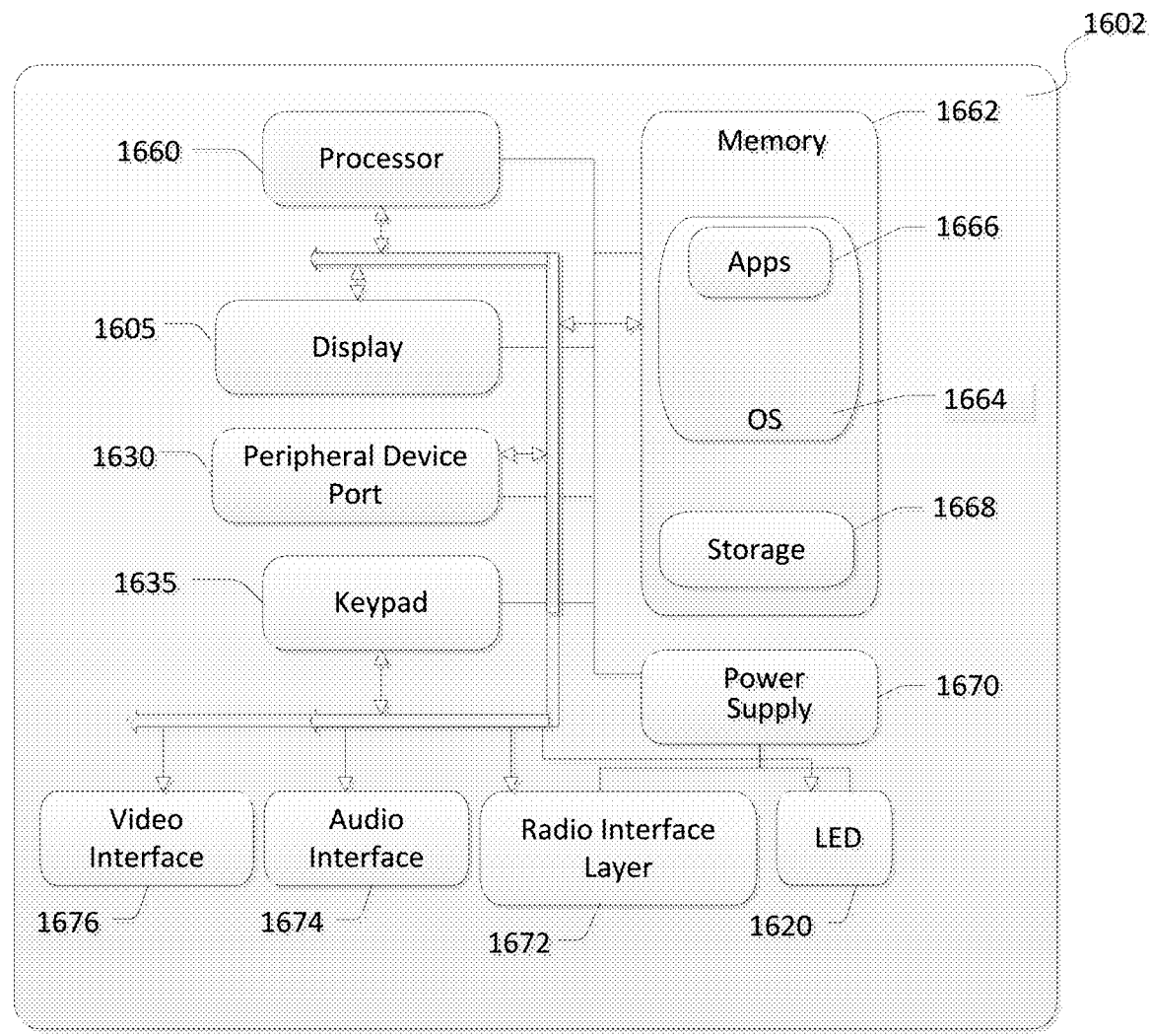
FIG. 16B is a simplified block diagram of an exemplary mobile computing device suitable for practicing one or more embodiments disclosed herein.
Figure 17:
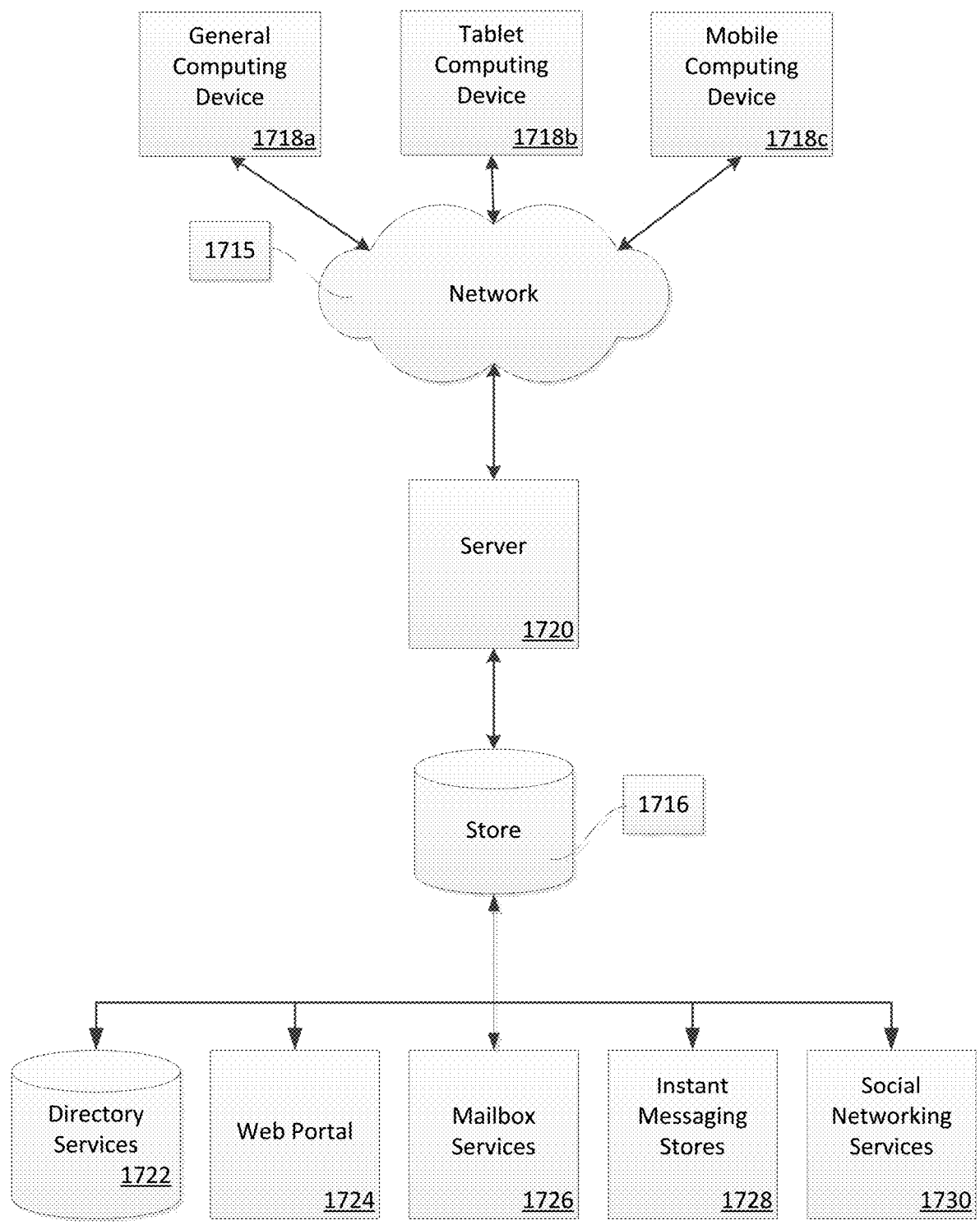
FIG. 17 is a simplified block diagram of an exemplary distributed computing system suitable for practicing one or more embodiments disclosed herein.

FIGS. 16A and 16B illustrate a mobile computing device 1600, for example, a mobile telephone, a smart phone, a tablet personal computer, a laptop computer, and the like, with which embodiments of the present disclosure may be practiced. With reference to FIG. 16A, an exemplary mobile computing device 1600 for implementing the embodiments is illustrated. In a basic configuration, the mobile computing device 1600 is a handheld computer having both input elements and output elements. The mobile computing device 1600 typically includes a display 1605 and one or more input buttons 1610 that allow the user to enter information into the mobile computing device 1600. The display 1605 of the mobile computing device 1600 may also function as an input device (e.g., a touch screen display). If included, an optional side input element 1615 allows further user input. The side input element 1615 may be a rotary switch, a button, or any other type of manual input element. In alternative embodiments, mobile computing device 1600 may incorporate more or less input elements. For example, the display 1605 may not be a touch screen in some embodiments. In yet another alternative embodiment, the mobile computing device 1600 is a portable phone system, such as a cellular phone. The mobile computing device 1600 may also include an optional keypad 1635. Optional keypad 1635 may be a physical keypad or a "soft" keypad generated on the touch screen display. In various embodiments, the output elements include the display 1605 for showing a graphical user interface (GUI), a visual indicator 1620 (e.g., a light emitting diode), and/or an audio transducer 1625 (e.g., a speaker). In some embodiments, the mobile computing device 1600 incorporates a vibration transducer for providing the user with tactile feedback. In yet another embodiment, the mobile computing device 1600 incorporates input and/or output ports, such as an audio input (e.g., a microphone jack), an audio output (e.g., a headphone jack), and a video output (e.g., a HDMI port) for sending data to or receiving data from an external device.

Although described herein in combination with the mobile computing device 1600, in alternative embodiments, features of the present disclosure may be used in combination with any number of computer systems, such as desktop environments, laptop or notebook computer systems, multiprocessor systems, microprocessor based or programmable consumer electronics, network PCs, mini computers, main frame computers and the like. Embodiments of the present disclosure may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present disclosure.

FIG. 16B is a block diagram illustrating the architecture of one embodiment of a mobile computing device. That is, the mobile computing device 1600 can incorporate a system (i.e., an architecture) 1602 to implement some embodiments. In one embodiment, the system 1602 is implemented as a "smart phone" capable of running one or more applications (e.g., browser, e-mail, calendaring, contact managers, messaging clients, games, and media clients/players). In some embodiments, the system 1602 is integrated as a computing device, such as an integrated personal digital assistant (PDA) and wireless phone.

One or more application programs 1666 may be loaded into the memory 1662 and run on or in association with the operating system 1664. Examples of the application programs include phone dialer programs, e-mail programs, personal information management (PIM) programs, word processing programs, spreadsheet programs, Internet browser programs, messaging programs, and so forth. The system 1602 also includes a non-volatile storage area 1668 within the memory 1662. The non-volatile storage area 1668 may be used to store persistent information that should not be lost if the system 1602 is powered down. The application programs 1666 may use and store information in the non-volatile storage area 1668, such as e-mail or other messages used by an e-mail application, and the like. A synchronization application (not shown) also resides on the system 1602 and is programmed to interact with a corresponding synchronization application resident on a host computer to keep the information stored in the non-volatile storage area 1668 synchronized with corresponding information stored at the host computer. As should be appreciated, other applications may be loaded into the memory 1662 and run on the mobile computing device 1600.

The system 1602 has a power supply 1670, which may be implemented as one or more batteries. The power supply 1670 might further include an external power source, such as an AC adapter or a powered docking cradle that supplements or recharges the batteries.

The system 1602 may also include a radio 1672 that performs the function of transmitting and receiving radio frequency communications. The radio 1672 facilitates wireless connectivity between the system 1602 and the "outside world", via a communications carrier or service provider. Transmissions to and from the radio 1672 are conducted under control of the operating system 1664. In other words, communications received by the radio 1672 may be disseminated to the application programs 1666 via the operating system 1664, and vice versa.

The radio 1672 allows the system 1602 to communicate with other computing devices, such as over a network. The radio 1672 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 1602 provides notifications using the visual indicator 1620 that can be used to provide visual notifications and/or an audio interface 1674 producing audible notifications via the audio transducer 1625. In the illustrated embodiment, the visual indicator 1620 is a light emitting diode (LED) and the audio transducer 1625 is a speaker. These devices may be directly coupled to the power supply 1670 so that when activated, they remain on for a duration dictated by the notification mechanism even though the processor 1660 and other components might shut down for conserving battery power. The LED may be programmed to remain on indefinitely until the user takes action to indicate the powered-on status of the device. The audio interface 1674 is used to provide audible data to and receive audible data from the user. For example, in addition to being coupled to the audio transducer 1625, the audio interface 1674 may also be coupled to a microphone to receive audible input, such as to facilitate a telephone conversation. In accordance with embodiments of the present disclosure, the microphone may also serve as an audio sensor to facilitate control of notifications, as will be described below. The system 1602 may further include a video interface 1676 that enables an operation of an on-board camera 1630 to record still images, video stream, and the like.

A mobile computing device 1600 implementing the system 1602 may have additional features or functionality. For example, the mobile computing device 1600 may also include additional data storage devices (removable and/or non-removable) such as, magnetic disks, optical disks, or tape. Such additional storage is illustrated in FIG. 16B by the non-volatile storage area 1668. Computer storage media may include volatile and nonvolatile, removable and non-removable media implemented in any method or technology for storage of information, such as computer readable instructions, data structures, program modules, or other data.

Data/information generated or captured by the mobile computing device 1600 and stored via the system 1602 may be stored locally on the mobile computing device 1600, as described above, or the data may be stored on any number of storage media that may be accessed by the device via the radio 1672 or via a wired connection between the mobile computing device 1600 and a separate computing device associated with the mobile computing device 1600, for example, a server computer in a distributed computing network, such as the Internet. As should be appreciated such data/information may be accessed via the mobile computing device 1600 via the radio 1672 or via a distributed computing network. Similarly, such data/information may be readily transferred between computing devices for storage and use according to well-known data/information transfer and storage means, including electronic mail and collaborative data/information sharing systems.

FIG. 17 illustrates one embodiment of the architecture of a system for providing converted documents to one or more client devices, as described above. In certain embodiments, the converted documents may be stored in different communication channels or other storage types. For example, various documents, including the converted documents, may be stored using a directory service 1722, a web portal 1724, a mailbox service 1726, an instant messaging store 1728, or a social networking site 1730. The various components of the system 100 use any of these types of systems or the like for enabling data utilization, as described herein. A server 1720 may provide the converted paragraphs to clients. The server 1720 may provide the converted paragraphs and the status updates over the web to clients through a network 1715. By way of example, the client computing device 1718 may be implemented as the computing device 1700 and embodied in a personal computer 1718a, a tablet computing device 1718b and/or a mobile computing device 1718c (e.g., a smart phone). Any of these embodiments of the client computing device 1718 may obtain content from the store 1716. In various embodiments, the types of networks used for communication between the computing devices that make up the present disclosure include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

Among other examples, the present disclosure presents systems and methods for parallel processing of data using a client device, comprising: receiving, at the client device, a signal comprising the data; sending at least a subset of data to a remote service; processing the data using a local service; sending an initial local service result to the remote service for analysis; receiving, from the remote service, an initial remote service result; and generating an intermediate local service result, wherein generating the intermediate local service result comprises updating the initial local service result based upon the initial remote service result. In further examples, sending the subset of data further comprises determining that the subset of data does not contain private data. In further examples, the local service is an inference service, and wherein processing the data using the local service comprises analyzing private data to generate local inference as the initial local service result. In further examples, sending the initial local service result further comprises: analyzing the local inference to determine whether the local inference can be provided to the remote service; and
when the local inference can be provided to the remote service, sending the local inference to the remote service. In further examples, when the local inference cannot be provided to the remote service, abstracting the local inference to remove private data; and sending the abstracted local inference to the remote service. In further examples, receiving an initial remote service result further comprises receiving an updated inference from the remote service, wherein the updated inference comprises additional information about the local inference. In further examples, generating a user experience based upon the updated inference. In further examples, the data comprises a natural language expression, and wherein the local service comprises a local natural language expression evaluation process. In further examples, processing the data further comprises: loading a local knowledge base; loading a third party knowledge base; and processing the natural language expression using the local knowledge base and the third party knowledge base. In further examples, identifying a unique term in the natural language expression, wherein the unique term is identified using the local knowledge base. In further examples, identifying a prefix in the natural language expression, wherein the prefix identifies a third party application; and comparing the natural language expression against a third party grammar associated with the third party application. In further examples, identifying at least one hint from the third party knowledge base; and wherein sending an initial local service result to the remote service for analysis comprises sending the at least one hint from the third party grammar. In further examples, receiving a remote service result; comparing the intermediate local service result and the intermediate remote service result; and based upon the comparison, generating a final result.

Further aspects disclosed herein provide exemplary systems and methods for processing of data using a distributed network, comprising: receiving, at the distributed network, data; processing the data using a remote service; during processing of the data, generating an initial remote service result; sending the initial remote service result to a client device; receiving, from the client device, an initial local service result, wherein the initial local service result is received prior to completion of processing the data; updating the processing of the data with the initial local service result; based upon the update, generating an intermediate remote service result; and sending the intermediate remote service result to the client device. In further examples, the initial local service result is a local inference, and wherein the intermediate remote service result comprises additional data related to the local inference. In further examples, the data is a natural language expression, and wherein the initial local service result comprises at least one third party hint. In further examples, updating the processing of the data further comprises: identifying at least one relevant knowledge base based upon the at least one third party hint; and analyzing the natural language expression using the at least one relevant knowledgebase. In further examples, receiving an intermediate local service result; and updating the intermediate remote service result based on the intermediate local service result.

Additional aspects disclosed herein provide exemplary hybrid client/server systems comprising: a client device comprising: at least one client processor; and client computer storage media encoding computer executable instructions perform a client method comprising: receiving a natural language expression; sending the natural language expression to a remote speech recognition process; processing the natural language expression to generate an initial local interpretation of the natural language expression; receiving an initial remote interpretation of the natural language expression from the distributed network; and the distributed network comprising at least one server, the server comprising: at least one server processor; and server computer storage media encoding computer executable instructions that, when executed by the at least one server processor, perform a server method comprising: receiving the natural language expression from the client device; processing the natural language expression in parallel with the client device to generate the initial remote interpretation of the natural language expression; sending the initial remote interpretation of the language expression to the client device; receiving an the initial local interpretation of the natural language expression; updating the initial remote interpretation based upon the initial local interpretation to generate an intermediate remote interpretation; and sending the intermediate remote interpretation to the client device. In further examples, the initial local interpretation comprises at least one third party hint.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices can be employed to perform the functionality disclosed herein without departing from the scope of the disclosure.

This disclosure described some embodiments of the present technology with reference to the accompanying drawings, in which only some of the possible aspects were described. Other aspects can, however, be embodied in many different forms and the specific embodiments disclosed herein should not be construed as limited to the various aspects of the disclosure set forth herein. Rather, these exemplary embodiments were provided so that this disclosure was thorough and complete and fully conveyed the scope of the other possible embodiments to those skilled in the art. For example, aspects of the various embodiments disclosed herein may be modified and/or combined without departing from the scope of this disclosure.

Although specific embodiments were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A method for parallel processing of data using a client computing device, the method comprising:
   receiving, at the client computing device, a signal comprising the data;
   sending, from the client computing device to at least one remote device, at least a subset of the data;
   processing, at the client computing device, the data using a local service of the client computing device, wherein processing the data comprises:
   loading a local knowledge base;
   loading a third party knowledge base; and
   processing the data using the local knowledge base and the third party knowledge base;
   sending an initial local service result to a remote service of the at least one remote device for analysis, wherein the initial local service result comprises a first partial determination generated during local processing;
   receiving, at the client computing device and from the remote service, an initial remote service result while processing the data using the local service, wherein the initial remote service comprises a second partial determination; and
   generating using the local service, an intermediate local service result, wherein generating the intermediate local service result comprises updating the initial local service result based upon the initial remote service result.

2. The method of claim 1, wherein sending the subset of data further comprises determining that the subset of data does not contain private data.

3. The method of claim 1, wherein the local service is an inference service, and wherein processing the data using the local service comprises analyzing private data to generate local inference as the initial local service result.

4. The method of claim 3, wherein sending the initial local service result further comprises:
   analyzing the local inference to determine whether the local inference can be provided to the remote service; and
   when the local inference can be provided to the remote service, sending the local inference to the remote service.

5. The method of claim 4, further comprising:
   when the local inference cannot be provided to the remote service, abstracting the local inference to remove private data; and
   sending the abstracted local inference to the remote service.

6. The method of claim 4, wherein receiving an initial remote service result further comprises receiving an updated inference from the remote service, wherein the updated inference comprises additional information about the local inference.

7. The method of claim 6, further comprising generating a user experience based upon the updated inference.

8. The method of claim 1, wherein the data comprises a natural language expression, and wherein the local service comprises a local natural language expression (NLE) evaluation process.

9. The method of claim 8, further comprising identifying a unique term in the natural language expression, wherein the unique term is identified using the local knowledge base.

10. The method of claim 8, further comprising:
    identifying a prefix in the natural language expression, wherein the prefix identifies a third party application; and
    comparing the natural language expression against a third party grammar associated with the third party application.

11. The method of claim 8, further comprising:
identifying at least one hint from the third party knowledge base; and
wherein sending an initial local service result to the remote service for analysis comprises sending the at least one hint from the third party grammar.

12. The method of claim 1, further comprising:
receiving an intermediate remote service result;
comparing the intermediate local service result and the intermediate remote service result; and
based upon the comparison, generating a final result.

13. A hybrid client/server system, the system comprising:
a client device comprising:
at least one client processor; and
client computer storage media encoding computer executable instructions perform a client method comprising:
receiving a natural language expression;
sending the natural language expression to a remote speech recognition process;
processing the natural language expression to generate an initial local interpretation of the natural language expression, wherein the initial local interpretation comprises a first partial determination, and wherein processing the natural language expression comprises:
loading a local knowledge base;
loading a third party knowledge base; and
processing the natural language expression using the local knowledge base and the third party knowledge base;
receiving an initial remote interpretation of the natural language expression from a distributed network; and
the distributed network comprising at least one server, the server comprising:
at least one server processor; and
server computer storage media encoding computer executable instructions that, when executed by the at least one server processor, perform a server method comprising:
receiving the natural language expression from the client device;
processing the natural language expression in parallel with the client device to generate the initial remote interpretation of the natural language expression, wherein the initial remote interpretation comprises a second partial determination generated during local processing;
sending the initial remote interpretation of the language expression to the client device;
receiving an the initial local interpretation of the natural language expression;
updating the initial remote interpretation based upon the initial local interpretation to generate an intermediate remote interpretation; and
sending the intermediate remote interpretation to the client device.

14. The system of claim 13, wherein the initial local interpretation comprises at least one third party hint.

15. A system comprising:
at least one processor; and
memory encoding computer executable instructions that, when executed by the at least one processor, cause the system to perform operations comprising:
receive, a signal comprising the data;
send, to at least one remote device, at least a subset of the data;
process, the data using a local service, wherein processing the data comprises:
loading a local knowledge base;
loading a third party knowledge base; and
processing the data using the local knowledge base and the third party knowledge base;
send an initial local service result to a remote service of the at least one remote device for analysis, wherein the initial local service result comprises a first partial determination generated during local processing;
receive, from the remote service, an initial remote service result while processing the data using the local service, wherein the initial remote service comprises a second partial determination; and
generate using the local service, an intermediate local service result, wherein generating the intermediate local service result comprises updating the initial local service result based upon the initial remote service result.

16. The system of claim 15, wherein the data comprises a natural language expression, and wherein the local service comprises a local natural language expression (NLE) evaluation process.

17. The system of claim 16, further comprising instructions that, when executed by the at least one processor, cause the system identify a unique term in the natural language expression, wherein the unique term is identified using the local knowledge base.

18. The system of claim 16, further comprising instructions that, when executed by the at least one processor, cause the system to perform operations comprising:
identify a prefix in the natural language expression, wherein the prefix identifies a third party application; and
compare the natural language expression against a third party grammar associated with the third party application.

19. The system of claim 16, further comprising instructions that, when executed by the at least one processor, cause the system to perform operations comprising:
identifying at least one hint from the third party knowledge base; and
wherein sending an initial local service result to the remote service for analysis comprises sending the at least one hint from the third party grammar.

20. The system of claim 15, further comprising instructions that, when executed by the at least one processor, cause the system to perform operations comprising:
receiving an intermediate remote service result;
comparing the intermediate local service result and the intermediate remote service result; and
based upon the comparison, generating a final result.

* * * * *